(12) United States Patent
Huang et al.

(10) Patent No.: US 9,927,608 B2
(45) Date of Patent: *Mar. 27, 2018

(54) CORRESPONDENCE RELATION SPECIFYING METHOD FOR ADAPTIVE OPTICS SYSTEM, WAVEFRONT DISTORTION COMPENSATION METHOD, ADAPTIVE OPTICS SYSTEM, AND STORAGE MEDIUM STORING PROGRAM FOR ADAPTIVE OPTICS SYSTEM

(71) Applicant: HAMAMATSU PHOTONICS K.K., Hamamatsu-shi, Shizuoka (JP)

(72) Inventors: Hongxin Huang, Hamamatsu (JP); Takashi Inoue, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 186 days.

This patent is subject to a terminal disclaimer.

(21) Appl. No.: 14/895,624

(22) PCT Filed: May 29, 2014

(86) PCT No.: PCT/JP2014/064296
§ 371 (c)(1),
(2) Date: Dec. 3, 2015

(87) PCT Pub. No.: WO2014/196450
PCT Pub. Date: Dec. 11, 2014

(65) Prior Publication Data
US 2016/0124222 A1 May 5, 2016

(30) Foreign Application Priority Data
Jun. 6, 2013 (JP) .................................. 2013-119859

(51) Int. Cl.
*G01J 1/20* (2006.01)
*G02B 27/00* (2006.01)
(Continued)

(52) U.S. Cl.
CPC ............ *G02B 27/0068* (2013.01); *G01J 9/00* (2013.01); *G02B 26/06* (2013.01); *G02F 2203/18* (2013.01)

(58) Field of Classification Search
CPC ....... G01J 9/00; G02B 26/06; G02B 27/0068; G02B 27/0927
See application file for complete search history.

(56) References Cited

U.S. PATENT DOCUMENTS 9,477,082 B2 * 10/2016 Huang .................. G01J 9/00
9,594,245 B2 * 3/2017 Huang .................. G02B 26/06
(Continued)

FOREIGN PATENT DOCUMENTS

| CN | 102138097 | 7/2011 |
| CN | 102265207 | 11/2011 |

(Continued)

OTHER PUBLICATIONS

Hongxin Huang et al., "Adaptive aberration compensation system using a high-resolution liquid crystal on silicon spatial light phase modulator, " Proceedings of SPIE, Dec. 3, 2008, pp. 71560F-1-71560F-10, vol. 7156.

(Continued)

*Primary Examiner* — Thanh Luu
(74) *Attorney, Agent, or Firm* — Drinker Biddle & Reath LLP

(57) ABSTRACT

An adaptive optics system includes a spatial light modulator configured to spatially modulate a phase of an optical image incident on a modulation surface including N two-dimensionally arranged regions and a wavefront sensor including (Continued)

a lens array having N two-dimensionally arranged lenses corresponding to the N regions and an optical detection element for detecting a light intensity distribution including K converging spots formed by the lens array and configured to receive the optical image after the modulation from the spatial light modulator, wherein a correspondence relation between the region of the spatial light modulator and the converging spot formed in the wavefront sensor is specified.

13 Claims, 31 Drawing Sheets

(51) Int. Cl.
*G02B 26/06* (2006.01)
*G01J 9/00* (2006.01)

(56) References Cited

U.S. PATENT DOCUMENTS

| | | | | |
|---|---|---|---|---|
| 2007/0158529 | A1* | 7/2007 | Smith | G02B 26/06 250/201.9 |
| 2009/0073411 | A1 | 3/2009 | Tanitsu | |

FOREIGN PATENT DOCUMENTS

| | | |
|---|---|---|
| CN | 102265208 | 11/2011 |
| EP | 2527901 | 11/2012 |
| JP | H09-15057 A | 1/1997 |
| JP | 2005-292662 | 10/2005 |
| JP | 2009-162614 A | 7/2009 |
| JP | 2010-261810 A | 11/2010 |
| JP | 4804358 | 11/2011 |
| JP | 2013-250525 A | 12/2013 |

OTHER PUBLICATIONS

Abdul Awwal et al., "Characterization and Operation of a Liquid Crystal Adaptive Optics Phoropter," Proceedings of SPIE, Dec. 31, 2003, pp. 104-122, vol. 5169.
Jason Porter et al., "Adaptive Optics for Vision Science, Principles, Practices, Design, and Applications" Chapter 18—Design and Testing of a Liquid Crystal Adaptive Optics Phoropter, Wiley Interscience, 2006, pp. 477-509.
International Preliminary Report on Patentability dated Dec. 17, 2015 for PCT/JP2014/064296.
Huang, Chenxi, "Correlation matching method for high-precision position detection of optical wortex using Shack Har", Optics Express, vol. 20, Issue 24, Nov. 2012, p. 26099-p. 26109

* cited by examiner

Fig.9
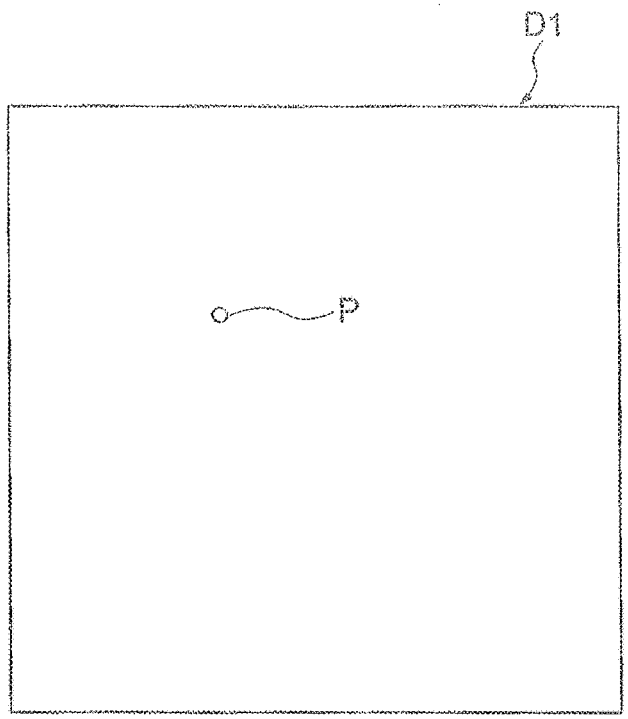
(a)
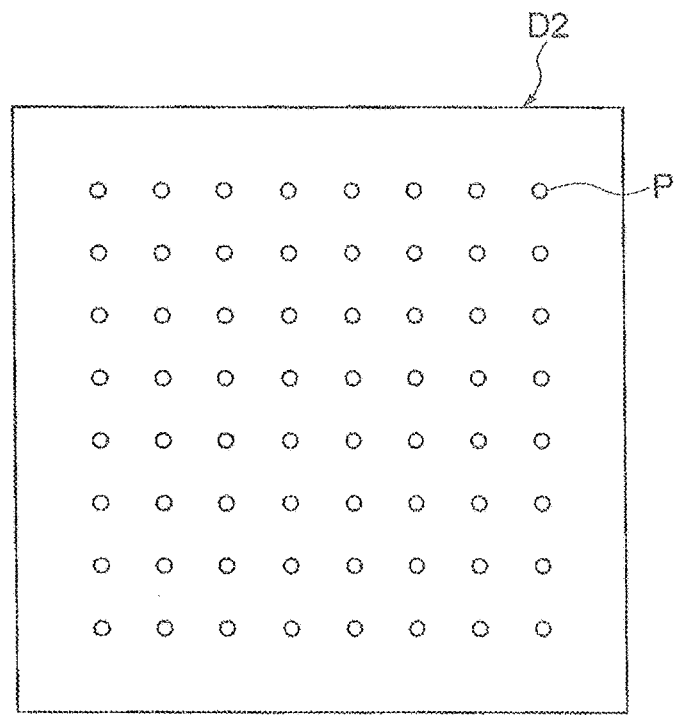
(b)

*Fig.21*
(a) 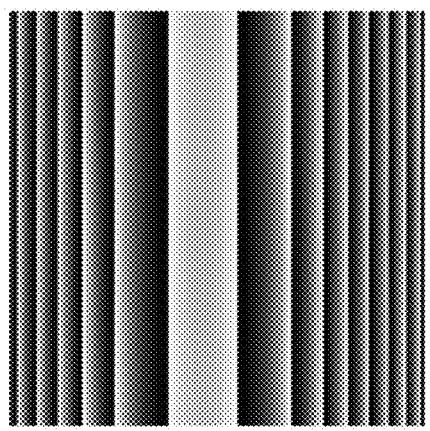
(b) 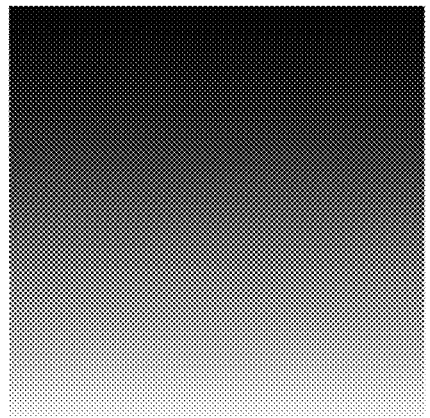
(c) 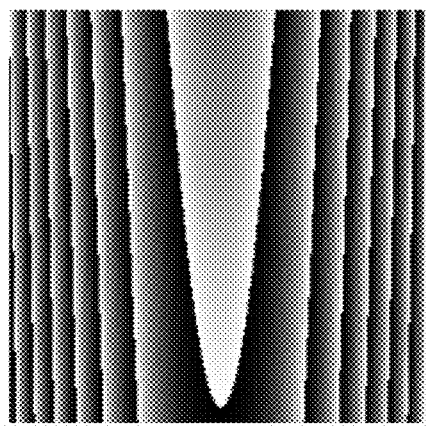

Fig.28
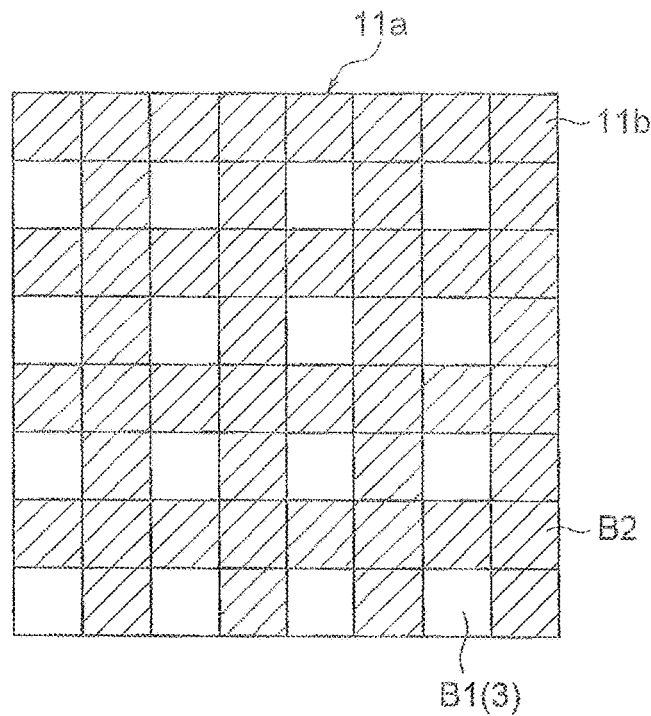
(a)
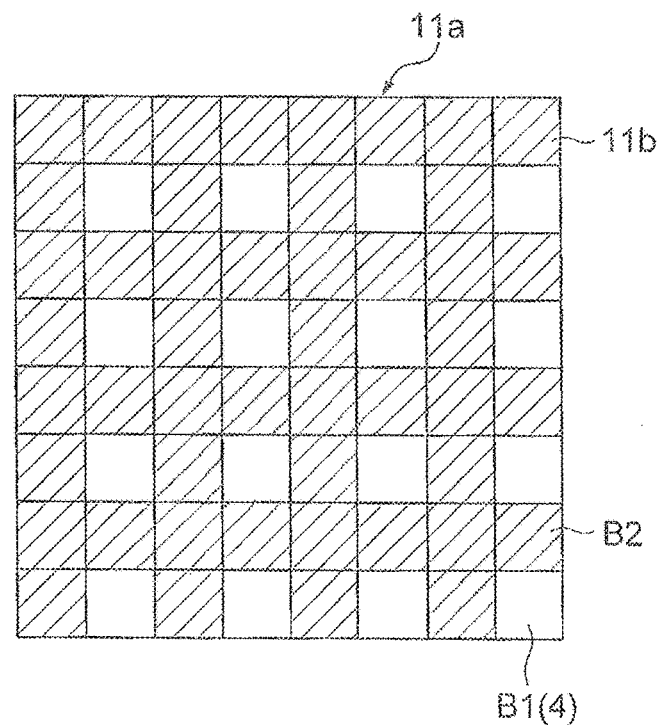
(b)

CORRESPONDENCE RELATION SPECIFYING METHOD FOR ADAPTIVE OPTICS SYSTEM, WAVEFRONT DISTORTION COMPENSATION METHOD, ADAPTIVE OPTICS SYSTEM, AND STORAGE MEDIUM STORING PROGRAM FOR ADAPTIVE OPTICS SYSTEM

TECHNICAL FIELD

An aspect of the present invention relates to a correspondence relation specifying method for an adaptive optics system, a wavefront distortion compensation method, an adaptive optics system, and a storage medium storing a program for an adaptive optics system.

BACKGROUND ART

In Patent Literature 1, technology related to a wavefront sensor for measuring a wavefront of light waves is disclosed. In the wavefront sensor, a characteristic (for example, light intensity) is applied to light passing through each of a plurality of lenses and image data is obtained from a light receiving element such as a CCD receiving the light. A measurement spot position is calculated from this image data, a characteristic of a converging spot is detected, a reference spot position corresponding to the converging spot having the characteristic and the measurement spot position are associated, and a wavefront is calculated from the associated reference spot position and measurement spot position.

CITATION LIST

Patent Literature

[Patent Literature 1] Japanese Unexamined Patent Publication No. H9-15057

SUMMARY OF INVENTION

Technical Problem

Adaptive optics technology is technology for dynamically removing an aberration by measuring an optical aberration (wavefront distortion) using a wavefront sensor and controlling a wavefront modulation element (spatial light modulator) based on a measurement result. It is possible to improve an imaging characteristic, a degree of convergence, an SN ratio of an image, and measurement precision through the above-described adaptive optics technology. Conventionally, the adaptive optics technology was mainly used in astronomical telescopes and large laser apparatuses. In recent years, the adaptive optics technology has been applied to ocular fundus cameras, scanning laser ophthalmoscopes, optical coherence tomography apparatuses, laser microscopes, etc. Imaging using such adaptive optics technology enables observation at high resolution that was previously unavailable. For example, the ocular aberration is removed by applying the adaptive optics technology to an ocular fundus imaging apparatus for observing the back (ocular fundus) of the eye. For example, it is possible to clearly draw a microstructure of the ocular fundus such as a visual cell, a nerve fiber, or a capillary. The adaptive optics technology can be applied to the early diagnosis of diseases concerning the circulatory system as well as ocular diseases.

An adaptive optics system for implementing the above-described adaptive optics technology is mainly constituted of a spatial light modulator, a wavefront sensor, and a control apparatus for controlling the spatial light modulator and the wavefront sensor. For example, it is possible to use a wavefront sensor (so-called Shack-Hartmann wavefront sensor) that includes a plurality of two-dimensionally arranged lenses and adopts a scheme of measuring the wavefront based on positional displacement from the reference position of the converging spot formed by each lens as the wavefront sensor.

In this adaptive optics system, it is important to accurately know a correspondence relation between a plurality of lenses of the wavefront sensor and a plurality of detected converging spots. FIG. 31 is a diagram illustrating a correspondence relation between a plurality of lenses 101 and a plurality of converging spots P when an optical image having a certain wavefront W is incident on the wavefront sensor. As shown in FIG. 31(a), the converging spot P formed by the corresponding lens 101 is located inside a plurality of regions 104 on a detection surface 103 opposite to the plurality of lenses 101 because an amount of positional displacement of each converging spot P is small when an aberration of the wavefront W is small. In this case, the aberration in the region is calculated based on a distance (an amount of positional displacement) between the position of the converging spot to be formed when the aberration of the wavefront W is zero, that is, a reference position, and a position of the converging spot P formed within the same region 104 as the reference position.

However, when the aberration of the wavefront W is large as illustrated in FIG. 31(b), the following problems occur. That is, because an amount of positional displacement of the converging spot P becomes large in such a case, the converging spot P may be located outside the region 104 opposite to the lens 101 which forms the converging spot P. Therefore, a situation in which there is no converging spot P in a certain region 104 and there are a plurality of converging spots P in another region 104 may occur. In addition, when the wavefront W is largely inclined as illustrated in FIG. 31(c), the converging spot P formed by each lens 101 may be located within a region 104 adjacent to a region 104 opposite to each lens 101.

Because a correspondence relation between the converging spot P and the lens 101 is unclear in the situation illustrated in FIG. 31(b) or 31(c), it is difficult to specify a region on the modulation surface of the spatial light modulator to be controlled based on the position of the converging spot P. Therefore, the precision of wavefront distortion compensation is degraded or a magnitude of wavefront distortion capable of being compensated for is limited. For example, when an adaptive optics system is applied to an ocular fundus imaging apparatus, an ocular aberration may significantly differ according to each measurement target person and the aberration may increase according to an ocular position or a position of an optical system for correcting near- or far-sightedness. In these cases, the above-described problems appear.

Also, in the scheme disclosed in Patent Literature 1, there are the following problems. In Patent Literature 1, a scheme of arranging an optical plate having a thickness differing according to each region corresponding to one lens before the lens, a scheme of arranging an optical plate having transmittance differing according to each region corresponding to one lens before the lens, and a scheme of arranging a liquid crystal shutter before the lens are shown as schemes of applying the characteristic to light passing through each of the plurality of lenses of the wavefront sensor. However, in these schemes, the optical plate or the like is newly arranged on an optical path of light to be measured and the number of components increases. Because loss occurs in light to be measured when the light passes through the optical plate or the like, the precision of wavefront detection may be degraded. Also, even when a mechanism capable of inserting and removing the optical plate or the like is provided according to necessity, it is difficult to adjust a relative position with the lens and a size of an apparatus increases.

An aspect of the present invention has been made in view of such problems and an objective of the invention is to provide a correspondence relation specifying method for an adaptive optics system, a wavefront distortion compensation method, an adaptive optics system, and a storage medium storing a program for an adaptive optics system that can precisely compensate for larger wavefront distortion by accurately specifying a correspondence relation between a converging spot of a wavefront sensor and a region on a modulation surface of a spatial light modulator to be controlled based on a position of the converging spot in a simple configuration while an increase of loss of light to be measured is controlled.

Solution to Problem

According to an aspect of the present invention for solving the above-described problems, there is provided a correspondence relation specifying method for an adaptive optics system, which includes a spatial light modulator configured to spatially modulate a phase of an optical image incident on a modulation surface including N (N is a natural number) two-dimensionally arranged regions and a wavefront sensor including a lens array having N two-dimensionally arranged lenses corresponding to the N regions and an optical detection element for detecting a light intensity distribution including K (K is a natural number and K≤N) converging spots formed by the lens array and configured to receive the optical image after the modulation from the spatial light modulator, wherein a correspondence relation between the region of the spatial light modulator and the converging spot formed in the wavefront sensor is specified, the correspondence relation specifying method including: a light intensity distribution acquiring step of acquiring the light intensity distribution through the optical detection element in a state in which at least one region of the N regions of the spatial light modulator is set as a target region, a phase pattern having linearity in at least one direction is displayed in the target region, and a spatially non-linear phase pattern is displayed in a plurality of regions surrounding the target region.

In the above-described method, in the adaptive optics system including the spatial light modulator and the wavefront sensor, as the light intensity distribution acquiring step, the light intensity distribution is acquired by the optical detection element of the wavefront sensor in a state in which the phase pattern having linearity in the at least one direction is displayed in the target region of the spatial light modulator and the spatially non-linear phase pattern is displayed in the plurality of regions (adjacent to the target region) surrounding the target region. In the light intensity distribution acquiring step, the converging spot corresponding to the target region is formed on the optical detection element. On the other hand, because light diverges according to the non-linear phase pattern in the plurality of regions surrounding the target region, converging spots corresponding to the plurality of regions are not formed or their light intensities are weakened. Therefore, there is no converging spot around the converging spot corresponding to the target region or the clarity of the converging spot is significantly degraded as compared with the converging spot corresponding to the target region. Accordingly, it is possible to easily specify the converging spot corresponding to the target region.

As described above, according to the above-described correspondence relation specifying method, it is possible to accurately specify the correspondence relation between the converging spot of the wavefront sensor and the region on the modulation surface of the spatial light modulator to be controlled based on the aberration calculated from the position of the converging spot. Accordingly, it is possible to precisely compensate for larger wavefront distortion. In addition, according to the above-described correspondence relation specifying method, it is possible to prevent the number of components from increasing because it is unnecessary to add a new component such as an optical plate like that in the configuration disclosed in Patent Literature 1, and it is possible to maintain the precision of wavefront detection by suppressing an increase of loss of light to be measured.

Also, in the correspondence relation specifying method for the adaptive optics system, the light intensity distribution may be acquired while the N regions of the spatial light modulator are set as the target region one by one. Also, in the correspondence relation specifying method for the adaptive optics system, N light intensity distributions corresponding to the N regions may be acquired by iterating the light intensity distribution acquiring step N times while the N regions of the spatial light modulator are sequentially set as the target region one by one. Thereby, it is possible to precisely compensate for larger wavefront distortion in all regions of the spatial light modulator.

Also, in the correspondence relation specifying method for the adaptive optics system, a plurality of regions which are not adjacent to each other among the N regions of the spatial light modulator may be set as the target region and the light intensity distribution may be acquired. Also, the light intensity distribution may be acquired while the plurality of regions to be set as the target region change. Further, in the correspondence relation specifying method for the adaptive optics system, M light intensity distributions may be acquired by iterating the light intensity distribution acquiring step M times (M is an integer greater than or equal to 2) while the N regions of the spatial light modulator are sequentially set as the target region for every two or more regions, and a plurality of target regions may be set so that the target regions are not adjacent to each other in each light intensity distribution acquiring step. Thereby, it is possible to precisely compensate for larger wavefront distortion in all regions of the spatial light modulator. Also, it is possible to shorten a processing time as compared with when regions are sequentially set one by one by sequentially setting the N regions of the spatial light modulator as the target region for every two or more regions.

Also, in the correspondence relation specifying method for the adaptive optics system, the spatially non-linear phase pattern may include a random distribution in which a distribution of magnitudes of phases is irregular. Alternatively, in the correspondence relation specifying method for the adaptive optics system, the spatially non-linear phase pattern may include a defocus distribution which increases a diameter of the converging spot. The phase pattern includes any of the above-described distributions, so that it is possible to implement the spatially non-linear phase pattern.

Also, in the correspondence relation specifying method for the adaptive optics system, the phase pattern having the linearity in the at least one direction may include a substantially uniform phase pattern or a phase distribution inclined in at least one direction. Alternatively, in the correspondence relation specifying method for the adaptive optics system, the phase pattern having the linearity in the at least one direction may include a phase distribution having a cylindrical lens effect in a first direction (for example, having a phase distribution of a quadratic function in the first direction) and substantially uniform in a second direction intersecting (for example, orthogonal to) the first direction or a phase distribution constituting a diffraction grating in a first direction and substantially uniform in a second direction intersecting (for example, orthogonal to) the first direction. The phase pattern includes any of the above-described distributions, so that it is possible to implement a phase pattern having linearity in at least one direction.

Also, according to an aspect of the present invention, there is provided a wavefront distortion compensation method for an adaptive optics system, which includes a spatial light modulator configured to spatially modulate a phase of an optical image incident on a modulation surface including N (N is a natural number) two-dimensionally arranged regions and a wavefront sensor including a lens array having N two-dimensionally arranged lenses corresponding to the N regions and an optical detection element for detecting a light intensity distribution including K (K is a natural number and K≤N) converging spots formed by the lens array and configured to receive the optical image after the modulation from the spatial light modulator, wherein wavefront distortion is compensated for by controlling a phase pattern displayed in the spatial light modulator based on a wavefront shape of the optical image obtained from the light intensity distribution, the wavefront distortion compensation method including; a light intensity distribution acquiring step of acquiring the light intensity distribution through the optical detection element in a state in which at least one region of the N regions of the spatial light modulator is set as a target region, a phase pattern having linearity in at least one direction is displayed in the target region, and a spatially non-linear phase pattern is displayed in a plurality of regions surrounding the target region; a wavefront distortion calculating step of calculating the wavefront distortion based on the light intensity distribution detected in the light intensity distribution acquiring step; and a displaying step of causing a phase pattern for correcting the wavefront distortion calculated in the wavefront distortion calculating step to be displayed on the modulation surface.

This wavefront distortion compensation method includes a similar light intensity distribution acquiring step to the correspondence relation specifying method of the above-described adaptive optics system. Accordingly, it is possible to accurately specify a converging spot corresponding to the target region and improve the precision of wavefront distortion compensation. In addition, it is possible to prevent the number of components from increasing because it is unnecessary to add a new component such as an optical plate, and it is possible to maintain the precision of wavefront detection by suppressing an increase of loss of light to be measured.

Also, according to an aspect of the present invention, there is provided an adaptive optics system including: a spatial light modulator configured to spatially modulate a phase of an optical image incident on a modulation surface including N (N is a natural number) two-dimensionally arranged regions; a wavefront sensor including a lens array having N two-dimensionally arranged lenses corresponding to the N regions and an optical detection element for detecting a light intensity distribution including K (K is a natural number and K≤N) converging spots formed by the lens array and configured to receive the optical image after the modulation from the spatial light modulator; and a control unit configured to compensate for wavefront distortion by controlling a phase pattern displayed in the spatial light modulator based on a wavefront shape of the optical image obtained from the light intensity distribution, wherein the control unit acquires the light intensity distribution through the optical detection element in a state in which at least one region of the N regions of the spatial light modulator is set as a target region, a phase pattern having linearity in at least one direction is displayed in the target region, and a spatially non-linear phase pattern is displayed in a plurality of regions surrounding the target region, calculates the wavefront distortion based on the light intensity distribution detected in the light intensity distribution acquiring step, and causes a phase pattern for correcting the wavefront distortion calculated in the wavefront distortion calculating step to be displayed on the modulation surface.

According to this adaptive optics system, the control unit acquires light intensity distribution in a state in which a phase pattern having linearity in at least one direction is displayed in the target region of the spatial light modulator and the spatially non-linear phase pattern is displayed in a plurality of regions surrounding the target region. Accordingly, as in the above-described correspondence relation specifying method, it is possible to accurately specify a converging spot corresponding to the target region and improve the precision of wavefront distortion compensation. In addition, it is possible to prevent the number of components from increasing because it is unnecessary to add a new component such as an optical plate and maintain the precision of wavefront detection by suppressing an increase of loss of light to be measured.

Also, there is provided a program for an adaptive optics system, which includes a spatial light modulator configured to spatially modulate a phase of an optical image incident on a modulation surface including N (N is a natural number) two-dimensionally arranged regions and a wavefront sensor including a lens array having N two-dimensionally arranged lenses corresponding to the N regions and an optical detection element for detecting a light intensity distribution including K (K is a natural number and K≤N) converging spots formed by the lens array and configured to receive the optical image after the modulation from the spatial light modulator, and a control unit configured to compensate for wavefront distortion by controlling a phase pattern displayed in the spatial light modulator based on a wavefront shape of the optical image obtained from the light intensity distribution, wherein the program controls an operation of the control unit, the program causing the control unit to execute: a light intensity distribution acquiring step of acquiring the light intensity distribution through the optical detection element in a state in which at least one region of the N regions of the spatial light modulator is set as a target region, a phase pattern having linearity in at least one direction is displayed in the target region, and a spatially non-linear phase pattern is displayed in a plurality of regions surrounding the target region; a wavefront distortion calculating step of calculating the wavefront distortion based on the light intensity distribution detected in the light intensity distribution acquiring step; and a displaying step of causing a phase pattern for correcting the wavefront distortion calculated in the wavefront distortion calculating step to be displayed on the modulation surface.

Also, according to an aspect of the present invention, there is provided a storage medium storing a program for an adaptive optics system, which includes a spatial light modulator configured to spatially modulate a phase of an optical image incident on a modulation surface including N (N is a natural number) two-dimensionally arranged regions and a wavefront sensor including a lens array having N two-dimensionally arranged lenses corresponding to the N regions and an optical detection element for detecting a light intensity distribution including K (K is a natural number and K≤N) converging spots formed by the lens array and configured to receive the optical image after the modulation from the spatial light modulator, and a control unit configured to compensate for wavefront distortion by controlling a phase pattern displayed in the spatial light modulator based on a wavefront shape of the optical image obtained from the light intensity distribution, wherein the program for the adaptive, optics system controls an operation of the control unit, the program for the adaptive optics system causing the control unit to execute: a light intensity distribution acquiring step of acquiring the light intensity distribution in a state in which at least one region of the N regions of the spatial light modulator is set as a target region, a phase pattern having linearity in at least one direction is displayed in the target region, and a spatially non-linear phase pattern is displayed in a plurality of regions surrounding the target region; a wavefront distortion calculating step of calculating the wavefront distortion based on the light intensity distribution detected in the light intensity distribution acquiring step; and a displaying step of causing a phase pattern for correcting the wavefront distortion calculated in the wavefront distortion calculating step to be displayed on the modulation surface.

The program for the adaptive optics system and the storage medium storing the program includes a similar light intensity distribution acquiring step to the above-described correspondence relation specifying method. Accordingly, it is possible to accurately specify the converging spot corresponding to the target region and improve the precision of wavefront distortion compensation. In addition, it is possible to prevent the number of components from increasing because it is unnecessary to add a new component such as an optical plate and maintain the precision of wavefront detection by suppressing an increase of loss of light to be measured.

Advantageous Effects of Invention

According to a correspondence relation specifying method for an adaptive optics system, a wavefront distortion compensation method, an adaptive optics system, and a storage medium storing a program for an adaptive optics system according to an aspect of the present invention, it is possible to compensate for larger wavefront distortion by accurately specifying a correspondence relation between a converging spot of a wavefront sensor and a region on a modulation surface of a spatial light modulator to be controlled based on a position of the converging spot while an increase of the number of components and an increase of loss of light to be measured are suppressed.

BRIEF DESCRIPTION OF DRAWINGS

FIG. 9 is a diagram conceptually illustrating light intensity distribution data (Shack-Hartmann-Gram) detected by the image sensor of the wavefront sensor.

FIG. 21 is a diagram illustrating an example of a composite pattern obtained through superimposition.

FIG. 28 is a diagram illustrating an example of an arrangement of a plurality of target regions according to the second modified example.

DESCRIPTION OF EMBODIMENTS

Hereinafter, embodiments of a correspondence relation specifying method for an adaptive optics system, a wavefront distortion compensation method, an adaptive optics system, a program for an adaptive optics system, and a storage medium storing a program for an adaptive optics system according to an aspect of the present invention will be described with reference to the accompanying drawings. Also, the same elements are assigned the same reference signs in the description of the drawings and redundant description thereof will be omitted. Also, in the following description, it is assumed that a "phase distribution" indicates two-dimensionally distributed phase values, a "phase pattern" indicates a pattern obtained by coding the phase distribution (two-dimensional phase values) based on a certain standard, and a "phase profile" indicates a distribution of phase values in a certain direction (line) in the phase distribution.

First Embodiment

Figure 1:
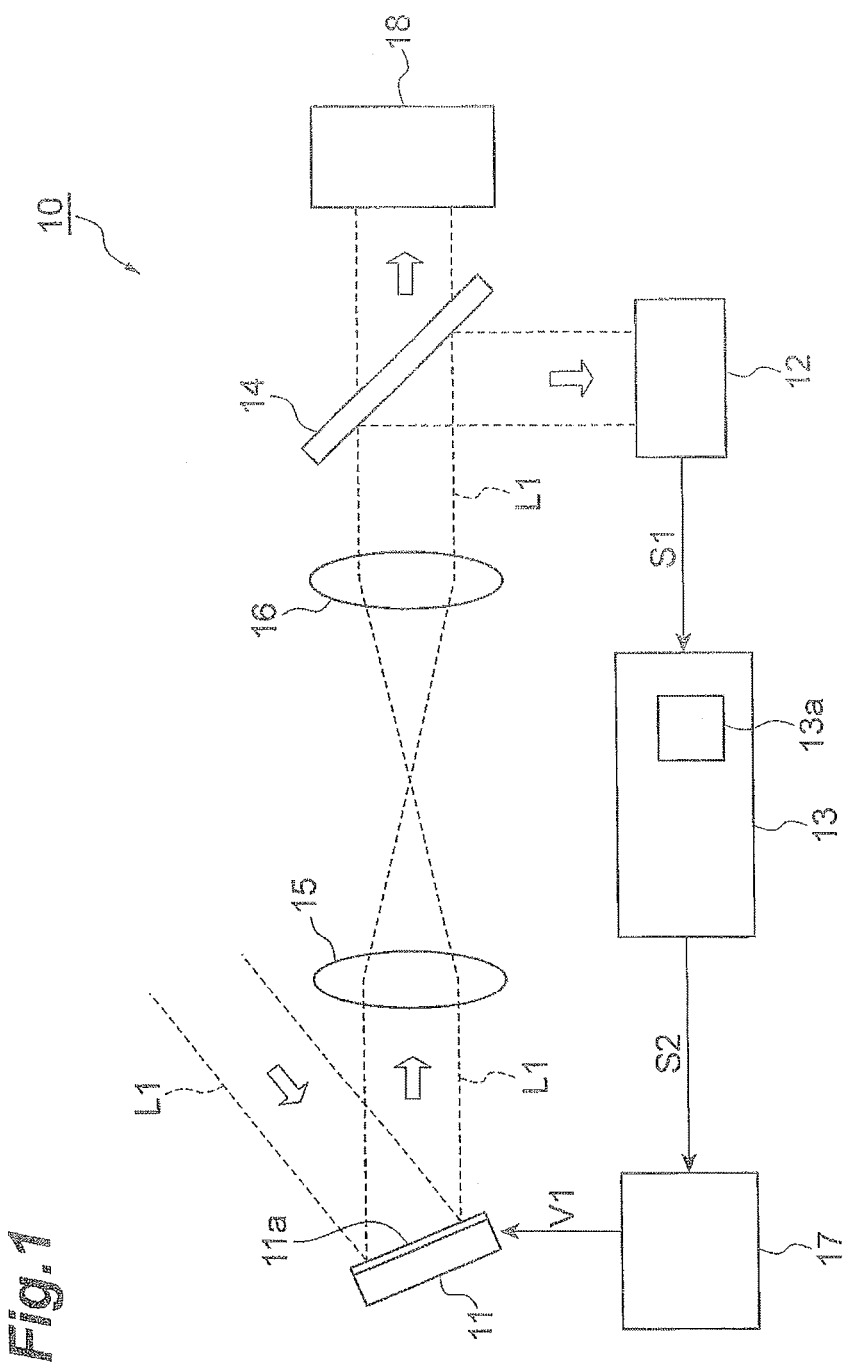
FIG. 1 is a diagram schematically illustrating a configuration of an adaptive optics system according to an embodiment.

FIG. 1 is a diagram schematically illustrating a configuration of an adaptive optics system 10 according to this embodiment. The adaptive optics system 10, for example, is embedded in an ophthalmologic inspection apparatus, a laser processing apparatus, a microscope apparatus, an adaptive optics apparatus, or the like. This adaptive optics system 10 includes a spatial light modulator (SLM) 11, a wavefront sensor 12, a control unit 13, a beam splitter 14, relay lenses 15 and 16, and a control circuit unit 17.

The spatial light modulator 11 receives an optical image L1 by a modulation surface 11a which displays a phase pattern and modulates a wavefront shape of the optical image L1 to output the modulated wavefront shape. The optical image L1 incident on the spatial light modulator 11, for example, is light emitted from a laser light source or a super luminescent diode (SLD) or reflected light, scattered light, fluorescent light, or the like generated from an observation object irradiated with light. The wavefront sensor 12 provides the control unit 13 with data S1 including information about the wavefront shape of the optical image L1 reaching from the spatial light modulator 11 (typically indicating distortion of a wavefront, that is, displacement of a wavefront from a reference wavefront, shown due to an aberration of an optical system). The control unit 13 generates a control signal S2 for displaying a phase pattern suitable for the spatial light modulator 11 based on the data S1 obtained from the wavefront sensor 12. In an example, the control unit 13 includes an input unit configured to input the data S1 from the wavefront sensor 12, an aberration calculation unit configured to calculate an aberration from the data S1, a phase pattern calculation unit configured to calculate a phase pattern to be displayed in the spatial light modulator 11, and a signal generation unit configured to generate the control signal S2 according to the calculated phase pattern. The control circuit unit 17 receives the control signal S2 from the control unit 13 and applies a voltage V1 based on the control signal S2 to a plurality of electrodes of the spatial light modulator 1.

The beam splitter 14 is arranged between the wavefront sensor 12 and the spatial light modulator 11 and branches the optical image L1. The beam splitter 14 may be a beam splitter of a polarization direction independent type, a polarization direction dependent type, or a wavelength dependent type (dichroic mirror). One optical image L1 branched by the beam splitter 14, for example, is sent to an optical detection element 18 such as a CCD, a photomultiplier tube, or an avalanche photodiode. The optical detection element 18, for example, is embedded in a scanning laser ophthalmoscope (SLO), an optical coherence tomography (OCT) camera, an ocular fundus camera, a microscope, a telescope, or the like. In addition, the other optical image L1 branched by the beam splitter 14 is incident on the wavefront sensor 12.

The relay lenses 15 and 16 are arranged side by side in an optical axis direction between the wavefront sensor 12 and the spatial light modulator 11. The wavefront sensor 12 and the spatial light modulator 11 are maintained in a mutually optical conjugate relation by the relay lenses 15 and 16. Also, an optical imaging lens and/or a polarization mirror, etc. may be further arranged between the wavefront sensor 12 and the spatial light modulator 11.

Figure 2:
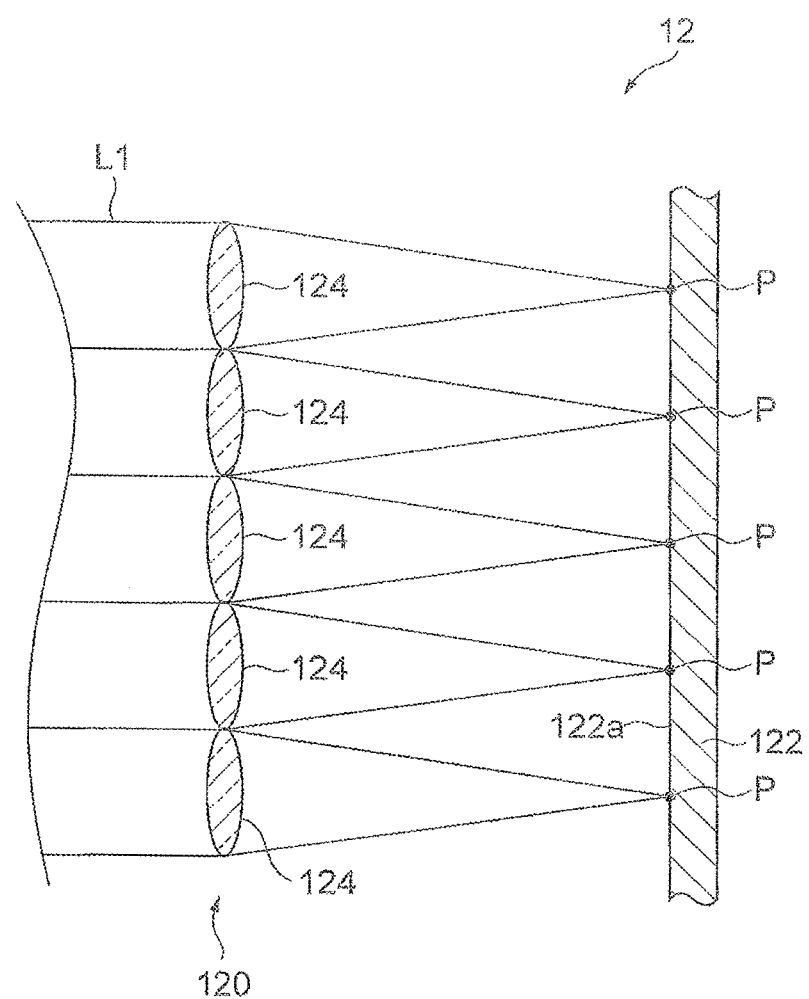
FIG. 2 is a cross-sectional view schematically illustrating a configuration of a wavefront sensor of an embodiment and illustrates a cross section along an optical axis of an optical image.
Figure 3:
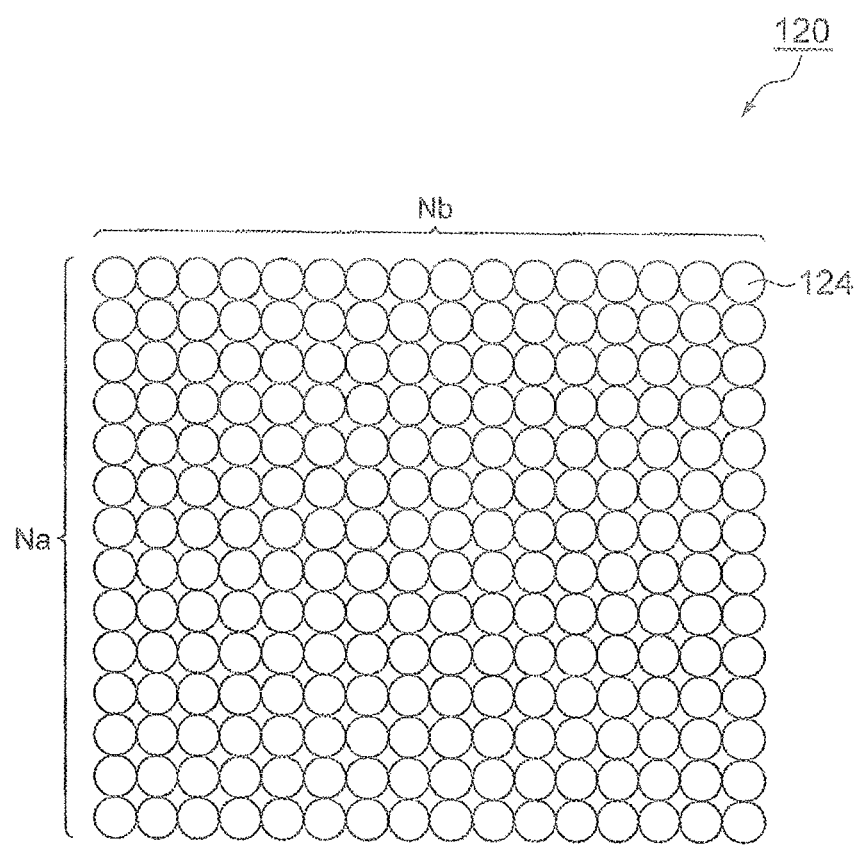
FIG. 3 is a view of a lens array provided in the wavefront sensor viewed in an optical axis direction of an optical image.

FIG. 2 is a cross-sectional view schematically illustrating a configuration of the wavefront sensor 12 of this embodiment and illustrates a cross section along the optical axis of the optical image L1. FIG. 3 is a view of a lens array 120 provided in the wavefront sensor 12 viewed in the optical axis direction of the optical image L1.

Although the wavefront sensor 12 may be of an interference type and a non-interference type, the non-interference type Shack-Hartmann wavefront sensor having the lens array 120 and the image sensor (optical detection element) 122 is used as the wavefront sensor 12 in this embodiment. When the non-interference type wavefront sensor 12 is used, there is an advantage in that vibration insensitivity is excellent and a configuration of the wavefront sensor and a process of calculating measurement data can be simpler than when the interference type wavefront sensor 12 is used.

As illustrated in FIG. 3, the lens array 120 has N (N is a natural number) lenses 124. The N lenses 124, for example, are arranged in a two-dimensional lattice shape of Na rows and Nb columns (Na and Nb are integers greater than or equal to 2).

Also, the image sensor 122 illustrated in FIG. 2 has a light receiving surface 122a at a position overlapping a back focal plane of the N lenses 124 constituting the lens array 120 and detects a light intensity distribution including K converging spots P (K is a natural number and K≤N) formed by the N lenses 124. In general, because light radiated to the lens array 120 is input to some lenses 124 of the lens array 120, the converging spot P is formed by the lens 124 irradiated with input light. Accordingly, the number of lenses 124, N', located within an irradiation range of the input light among the N lenses 124 constituting the lens array 120 is equal to the number of converging spots P, K. Of course, when the entire lens array 120 is irradiated with the input light, the number N becomes equal to the number N' and N=K. In the control unit 13 to be described below, the wavefront shape of the optical image L1 (a distribution of phase gradients) is measured based on the light intensity distribution. That is, a magnitude of displacement between the position of the converging spot P by the lens 124 and the reference position is in proportion to a slope of a local wavefront of the optical image L1 incident on the lens 124. Therefore, it is possible to calculate the magnitude of the positional displacement of the converging spot P from the reference position for every lens 124 and measure the wavefront shape of the optical image L based on the positional displacement of the converging spot P.

Also, pixels constituting the light receiving surface 122a of the image sensor 122 are also arranged in a two-dimensional lattice shape and a horizontal direction and a vertical direction of the pixels match a horizontal direction and a vertical direction of the lens array 120, respectively. However, a pixel pitch of the image sensor 122 becomes sufficiently smaller than a pitch of the lens array 120 so that the magnitude of displacement of the converging image position from the reference position can be detected with high precision.

Also, it is possible to designate a position at which an optical axis of each of the plurality of lenses 124 intersects the light receiving surface 122a of the image sensor 122 as the reference position to be used to calculate the magnitude of the displacement of the converging image position. This position is easily obtained through center-of-gravity calculation using a converging image obtained by causing parallel plane waves to be perpendicularly incident on each lens 124.

The spatial light modulator 11 is an element which receives the optical image L1 from a light source or an observation object and modulates a wavefront of the optical image L1 to output the modulated wavefront. Specifically, the spatial light modulator 11 has a plurality of pixels (control points) arranged in a two-dimensional lattice shape and changes a modulation amount (for example, a phase modulation amount) of each pixel according to the control signal S2 provided from the control unit 13. The spatial light modulator 11, for example, includes a liquid crystal on silicon (LCOS) spatial light modulator, an electrical address type spatial light modulator formed by coupling an LCD element and an optical address type liquid-crystal spatial light modulator, or micro electro mechanical systems (MEMS). Also, although the reflection type spatial light modulator 11 is illustrated in FIG. 1, the spatial light modulator 11 may be of a transmission type.

Figure 4:
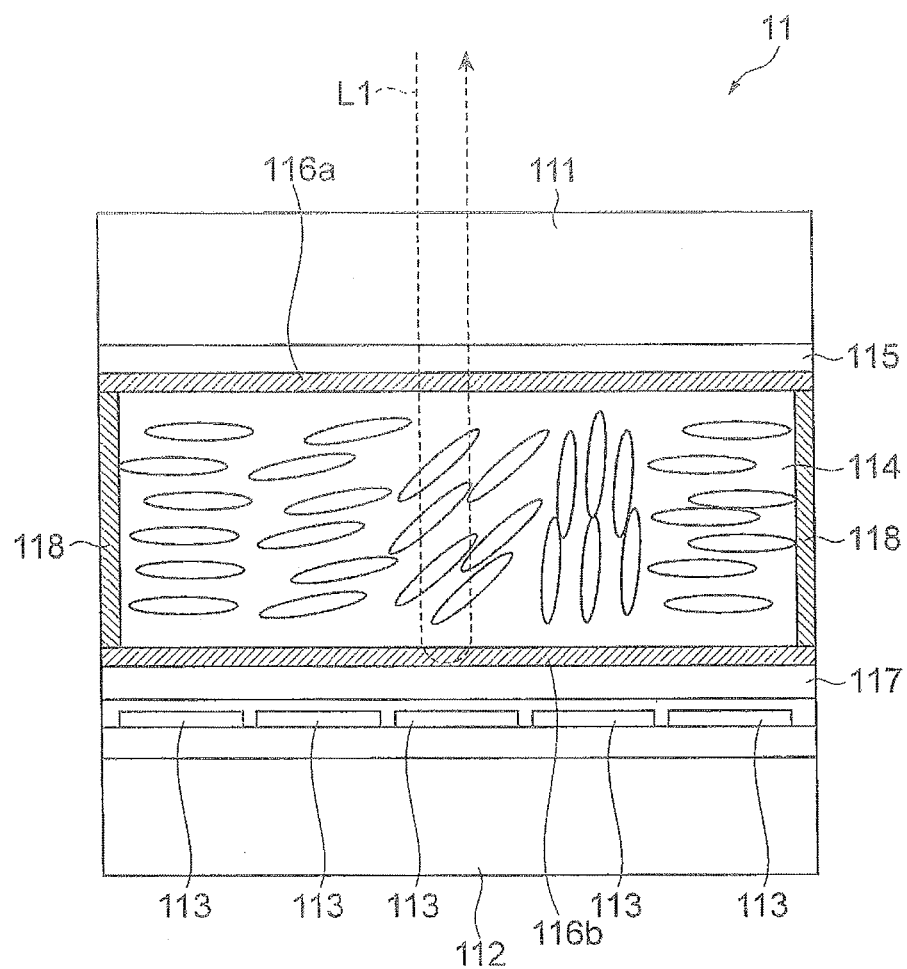
FIG. 4 is a cross-sectional view schematically illustrating an LCOS type spatial light modulator as an example of a spatial light modulator of an embodiment and illustrates a cross section along the optical axis of the optical image.

FIG. 4 is a cross-sectional view schematically illustrating an LCOS type spatial light modulator as an example of the spatial light modulator 11 of this embodiment and illustrates a cross section along the optical axis of the optical image L1. This spatial light modulator 11 includes a transparent substrate 111, a silicon substrate 112, a plurality of pixel electrodes 113, a liquid crystal unit (modulation unit) 114, a transparent electrode 115, oriented films 116a and 116b, a dielectric mirror 117, and a spacer 118.

The transparent substrate 111 is formed of a material which transmits the optical image L1 and arranged along a main surface of the silicon substrate 112. The plurality of pixel electrodes 113 are arranged in a two-dimensional lattice shape on the main surface of the silicon substrate 112 and constitute pixels of the spatial light modulator 11. The transparent electrode 115 is arranged on the surface of the transparent substrate 111 opposite to the plurality of pixel electrodes 113. The liquid crystal unit 114 is arranged between the plurality of pixel electrodes 113 and the transparent electrode 115. The oriented film 116a is arranged between the liquid crystal unit 114 and the transparent electrode 115 and the oriented film 116b is arranged between the liquid crystal unit 114 and the plurality of pixel electrodes 113. The dielectric mirror 117 is arranged between the oriented film 116b and the plurality of pixel electrodes 113. The dielectric mirror 117 reflects the optical image L1 incident from the transparent substrate 111 and transmitted through the liquid crystal unit 114 and causes the optical image L1 to be re-emitted from the transparent substrate 111.

Also, the spatial light modulator 11 further includes a pixel electrode circuit (active matrix drive circuit) 119 configured to control a voltage to be applied between the plurality of pixel electrodes 113 and the transparent electrode 115. When the voltage is applied from the pixel electrode circuit 119 to any pixel electrode 113, a refractive index of the liquid crystal unit 114 on the pixel electrode 113 changes according to a magnitude of an electric field generated between the pixel electrode 113 and the transparent electrode 115. Accordingly, an optical path length of the optical image L1 transmitted through a relevant part of the liquid crystal unit 114 changes and consequently a phase of the optical image L1 changes. By applying voltages of various magnitudes to the plurality of pixel electrodes 113, it is possible to electrically write a spatial distribution of a phase adjustment amount and implement various wavefront shapes if necessary.

Description will now return to FIG. 1. In this adaptive optics system 10, the optical image L1 from a light source or an observation object (not illustrated) is first incident on the spatial light modulator 11 as substantially parallel light. The optical image L1 modulated by the spatial light modulator 11 is incident on the beam splitter 14 via the relay lenses 15 and 16 and is branched into two optical images. One optical image L1 after the branching is incident on the wavefront sensor 12. The data S1 including the wavefront shape (for example, phase distribution) of the optical image L1 is generated in the wavefront sensor 12 and the data S1 is provided to the control unit 13. The control unit 13 calculates the wavefront shape (phase distribution) of the optical image L1 if necessary based on the data S1 from the wavefront sensor 12 and outputs the control signal S2 including the phase pattern for appropriately compensating for wavefront distortion of the optical image L1 to the spatial light modulator 11. Thereafter, the non-distortion optical image L1 compensated for by the spatial light modulator 11 is branched by the beam splitter 14 and is incident on the optical detection element 18 via an optical system (not illustrated) and captured.

Figure 5:
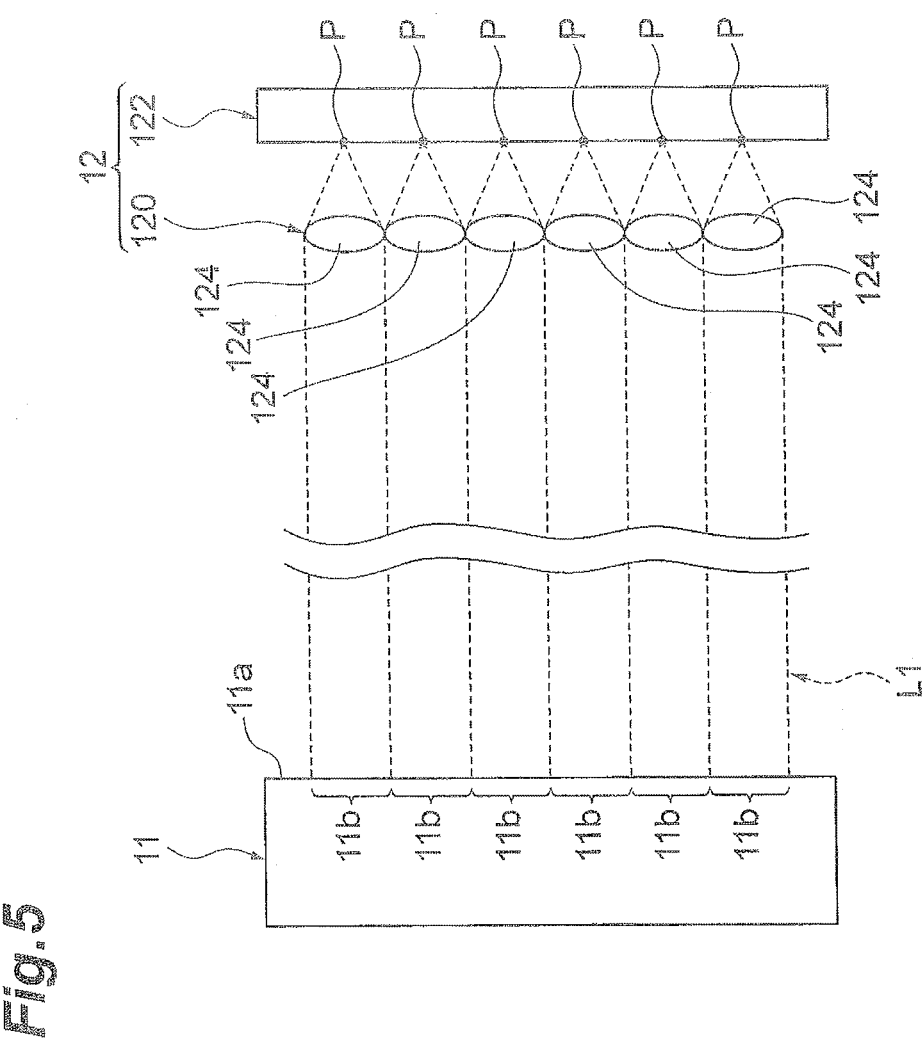
FIG. 5 is a diagram illustrating a simplified relation between the spatial light modulator and the wavefront sensor.

Here, FIG. 5 is a diagram illustrating a simplified relation between the spatial light modulator 11 and the wavefront sensor 12. In the adaptive optics system 10 including the above-described configuration, it is necessary to accurately specify a correspondence relation between K converging spots P formed by the N lenses 124 and N regions 11b on the modulation surface 11a of the spatial light modulator 11 to be controlled based on positional displacement information of the K converging spots P so as to accurately detect the wavefront shape of the optical image L1 in the wavefront sensor 12.

Figure 6:
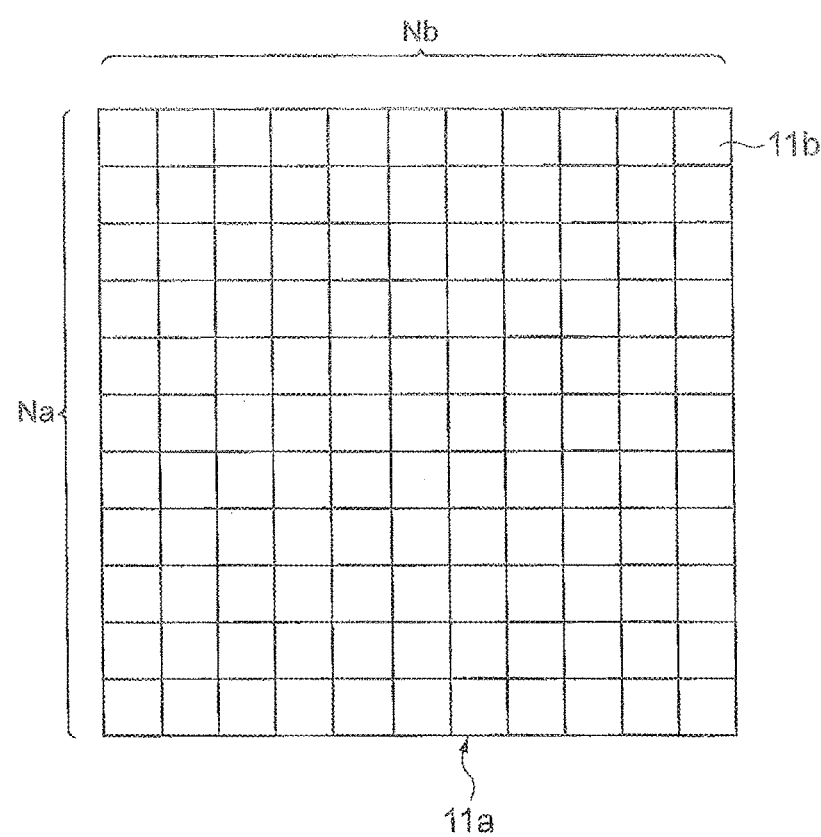
FIG. 6 is a front view of a modulation surface of the spatial light modulator.

FIG. 6 is a front view of the modulation surface 11a of the spatial light modulator 11. As illustrated in FIG. 6, the N regions 11b assumed on the modulation surface 11a are arranged in a two-dimensional shape (for example, Na rows and Nb columns) as in the N lenses 124, and correspond one-to-one to the N lenses 124. In addition, a plurality of pixels are included in each region 11b. Also, a length d of one side of each region 11b is calculated as d=G×mlaPitch/slmPitch (here, G denotes optical imaging magnification between the spatial light modulator 11 and the wavefront sensor 12, mlaPitch denotes a pitch of the lens array 120, and slmPitch denotes a pixel pitch of the spatial light modulator 11).

Hereinafter, a method of specifying the correspondence relation between the K converging spots P and the N regions 11b on the modulation surface 11a in the adaptive optics system 10 and the wavefront distortion compensation method according to this embodiment will be described in detail. Also, this specifying method, for example, is incorporated into a wavefront distortion compensation operation in the control unit 13.

Figure 7:
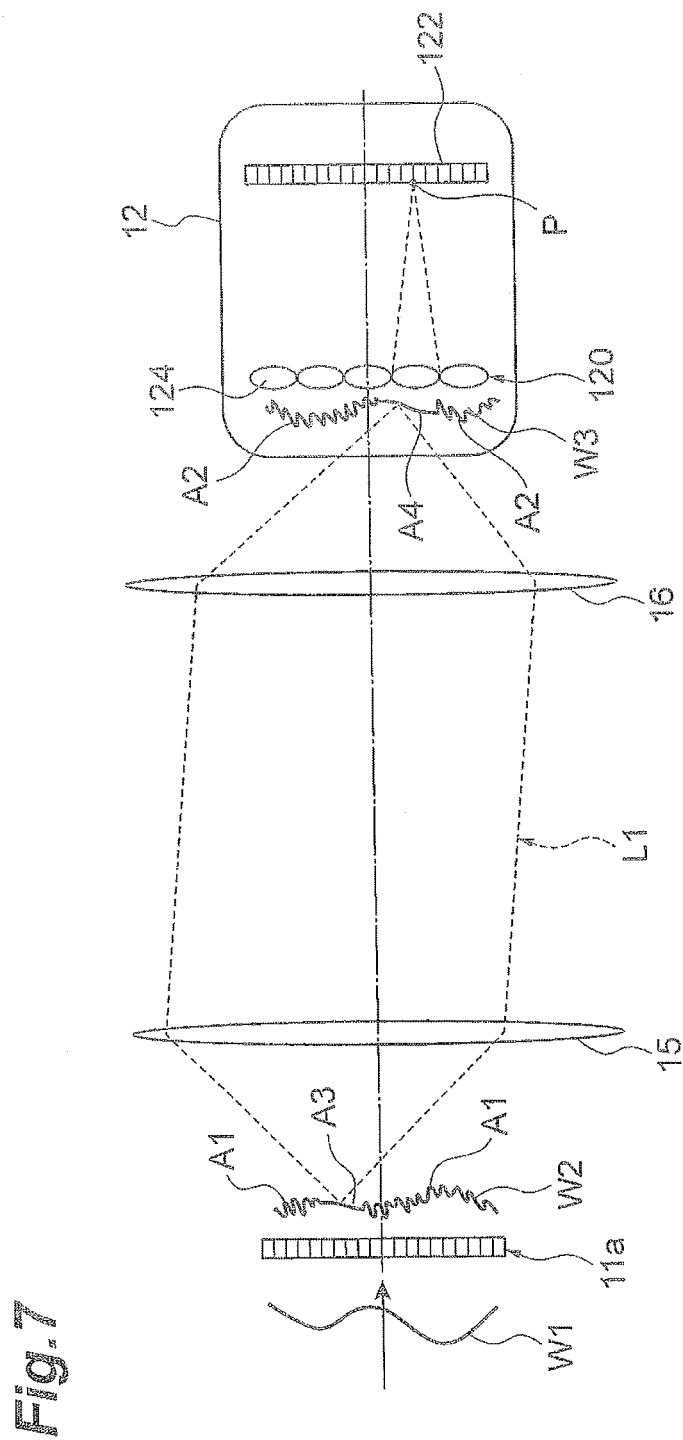
FIG. 7 is a conceptual diagram illustrating the principle of a method of specifying a corresponding relation between a region on the modulation surface and the converging spot.

FIG. 7 is a conceptual view illustrating the principle of the specifying method in this embodiment. In FIG. 7, the relay lenses 15 and 16, a wavefront W1 of an optical image incident on the modulation surface 11a, a wavefront W2 of the optical image emitted from the modulation surface 11a, and a wavefront W3 of the optical image incident on the wavefront sensor 12 are illustrated in addition to the modulation surface 11a of the spatial light modulator 11 and the wavefront sensor 12 (the lens array 120 and the image sensor 122). The wavefront W2 obtained by applying a wavefront according to the phase pattern to the incident wavefront W1 is emitted from the spatial light modulator 11. The wavefront W3 via a conjugate optical system including the relay lenses 15 and 16 is incident on the wavefront sensor 12. In addition, the optical image L1 emitted from the region 11b on the modulation surface 11a and reaching the lens 124 of the wavefront sensor 12 corresponding to the region 11b is illustrated in FIG. 7.

Here, a phase pattern having linearity in at least one direction is displayed in a certain region 11b (hereinafter referred to as a target region) on the modulation surface 11a. This phase pattern, for example, is implemented to include a substantially uniform phase distribution, a phase distribution inclined in at least one direction, or the like. Alternatively, this phase pattern is implemented to include a phase distribution having a cylindrical lens effect, that is, a phase distribution having a quadratic function in a first direction and substantially uniform in a second direction intersecting (for example, orthogonal to) the first direction or a phase distribution constituting a diffraction grating in a first direction and substantially uniform in a second direction intersecting (for example, orthogonal to) the first direction.

In addition, simultaneously, it is assumed that the spatially non-linear phase pattern (for example, a random distribution in which a distribution of magnitudes of phases is irregular, a defocus distribution which increases a diameter of the converging spot, or the like) is displayed in a plurality of regions 11b surrounding a target region on the modulation surface 11a. Then, the wavefront of the part corresponding to the plurality of regions 11b in the emission wavefront W2 is disturbed (part A1 of FIG. 7). The disturbance of the wavefront also occurs in a part incident on the lens 124 corresponding to the plurality of regions 11b in the incident wavefront W3 for the wavefront sensor 12 (part A2 of FIG. 7). Thereby, the converging spot P formed by the lens 124 diverges and the converging spot P is not formed, or its light intensity becomes weak.

On the other hand, in parts (parts A3 and A4 of FIG. 7) corresponding to target regions in the wavefronts W2 and W3, the wavefront in at least one direction is incident on the lens 124 without being disturbed through a phase pattern having linearity in the at least one direction. Therefore, the converging spot P is clearly formed by the lens 124.

Figure 8:
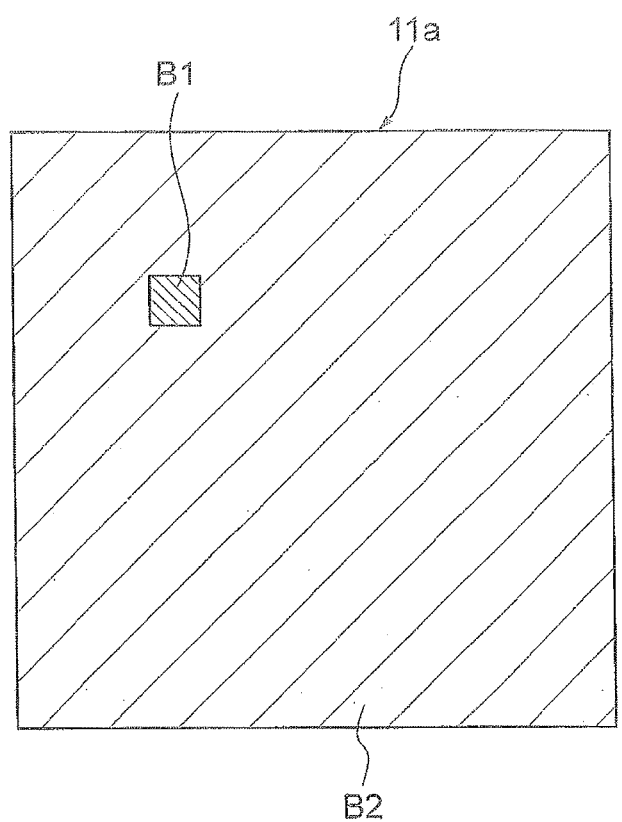
FIG. 8 is a diagram conceptually illustrating a phase pattern displayed on the modulation surface.

FIG. 8 is a diagram conceptually illustrating the phase pattern displayed on the modulation surface 11a. In FIG. 8, a region B1 is a region (that is, a target region) in which a phase pattern having linearity in at least one direction is displayed and a region B2 is a region in which the spatially non-linear phase pattern is displayed. As described, in this embodiment, the phase pattern having the linearity in the at least one direction is displayed in one certain target region B1 among the N regions 11b.

FIG. 9 is a diagram conceptually illustrating light intensity distribution data (Shack-Hartmann-Gram) detected by the image sensor 122 of the wavefront sensor 12. FIG. 9(a) illustrates light intensity distribution data D1 of the case in which a phase pattern having linearity in at least one direction is displayed in the target region B11 and a spatially non-linear phase pattern is displayed in another region B2 and FIG. 9(b) illustrates light intensity distribution data D2 of the case in which a phase pattern having linearity is displayed in all regions for comparison.

As illustrated in FIG. 9(b), K converging spots P corresponding to the N regions 11b are included in the light intensity distribution when the phase pattern having the linearity is displayed in all the regions. On the other hand, when the phase pattern having the linearity in at least one direction is displayed in the target region B1 and the spatially non-linear phase pattern is displayed in the other region B2 as illustrated in FIG. 9(a), one converging spot P corresponding to the target region B1 is included in the light intensity distribution data, but the converging spot corresponding to the other region B2 is not formed or a maximum intensity is reduced even when the converging spot is formed. Accordingly, it is possible to easily specify the converging spot P corresponding to the target region B1 based on the light intensity distribution data D1 illustrated in FIG. 9(a).

Figure 10:
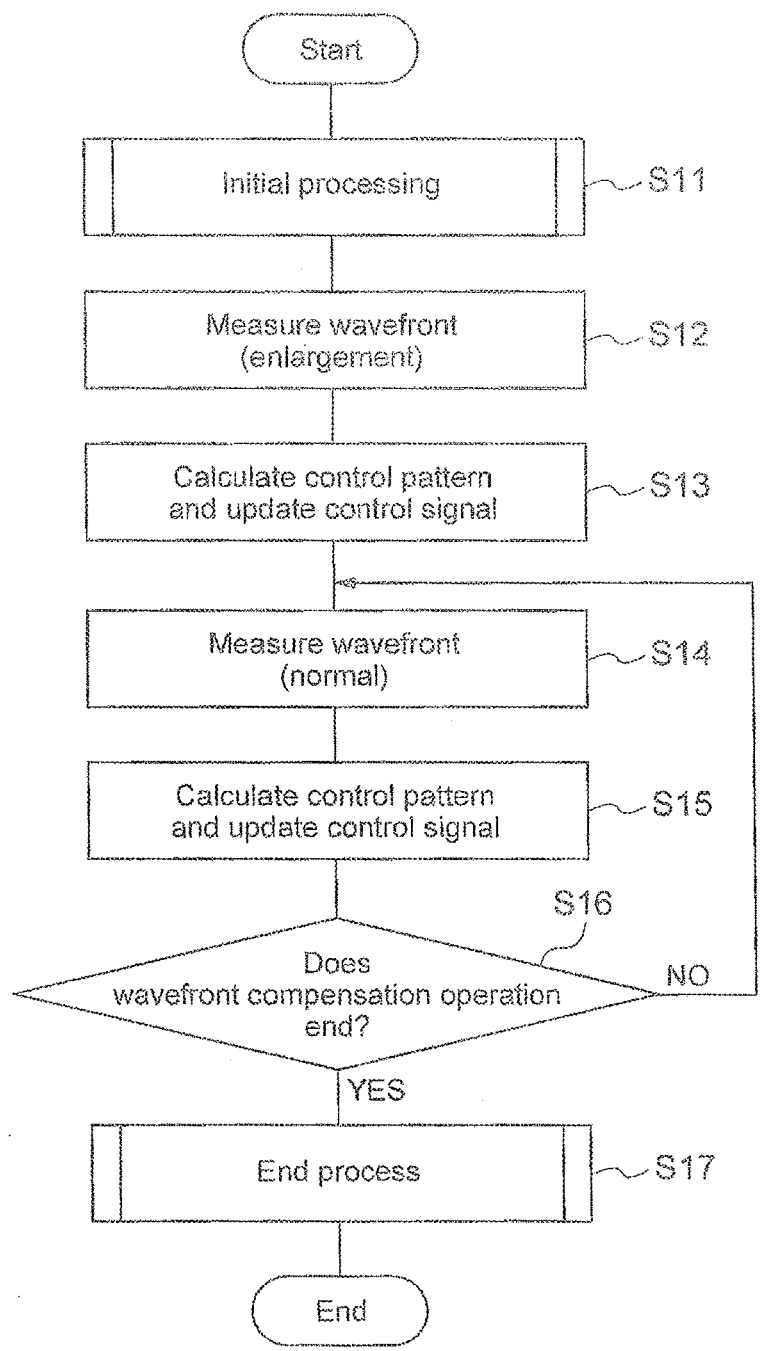
FIG. 10 is a flowchart illustrating an operation and a wavefront compensating method of an adaptive optics system of an embodiment.

An operation and wavefront distortion compensation method of the adaptive optics system 10 including a method of specifying the correspondence relation between each region 11b of the modulation surface 11a and the converging spot P described above will be described with reference to FIG. 10. FIG. 10 is a flowchart illustrating the operation and wavefront compensation method of the adaptive optics system 10 of this embodiment. Also, the compensation method is stored as the program for the adaptive optics system inside the storage region 3a of the control unit 13 illustrated in FIG. 1 and the control unit 13 executes the compensation method by reading the program. Also, the control unit 13 can be mainly constituted of a computer including a CPU, a RAM and a ROM which are main storage apparatuses, a communication module for performing communication, and a hardware resource such as an auxiliary storage apparatus such as a hard disk. The program for the adaptive optics system is stored in a storage medium inserted into the computer and accessed or a storage medium provided in the computer. This storage medium, for example, corresponds to a magnetic disc, an optical disc, a CD-ROM, a USB memory, a memory (the storage region 13*a*) embedded in the computer, or the like.

In the adaptive optics system 10, initial processing of the control unit 13 is first performed (step S11). In this initial processing step S11, for example, securement of a memory region necessary for a calculation process, initial setting of parameters, etc. are performed.

Next, the control unit 13 performs wavefront measurement (aberration measurement) (step S12). In this wavefront measuring step S12, wavefront measurement in which a dynamic range is enlarged is performed using a method in which the above-described method of specifying the correspondence relation between the K converging spots P and the N regions 11*b* of the modulation surface 11*a* is combined with a normal wavefront measuring method.

Figure 11:
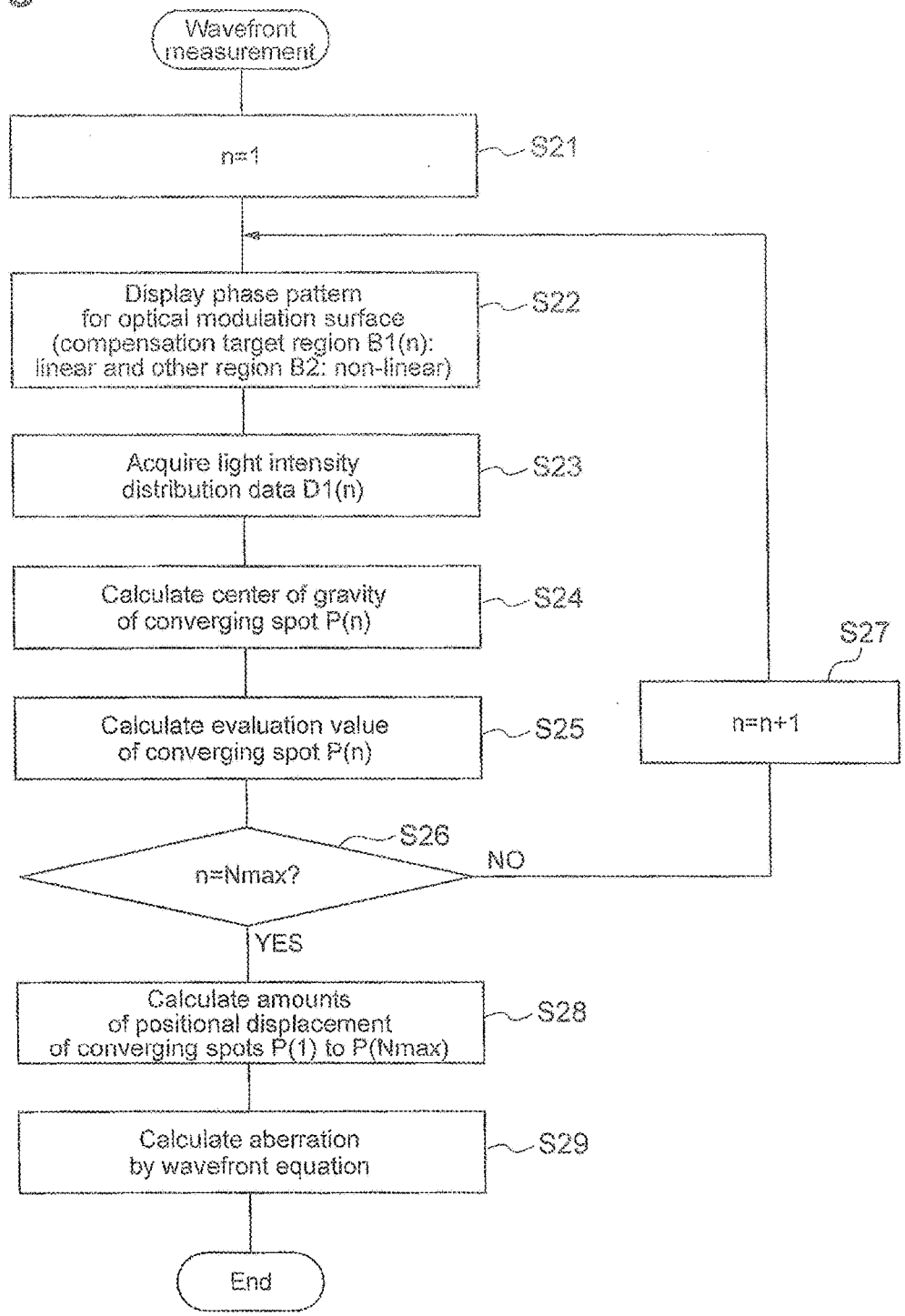
FIG. 11 is a flowchart illustrating an example of a wavefront measuring process to be executed in a control unit.

FIG. 11 is a flowchart illustrating an example of a wavefront measuring process to be executed in the control unit 13. As illustrated in FIG. 11, the control unit 13 first sets a variable n indicating the number of iterations to 1 (step S21). Next, the control unit 13 causes a phase pattern having linearity in at least one direction to be displayed in a certain target region B1(*n*) on the modulation surface 11*a*. Simultaneously, the control unit 13 causes a spatially non-linear phase pattern to be displayed in another region B2 on the modulation surface 11*a* (step S22). In this state, the control unit 13 acquires light intensity distribution data created by the image sensor 122 of the wavefront sensor 12 (step S23, light intensity distribution acquiring step in this embodiment). As illustrated in FIG. 9(*a*), this light intensity distribution data includes one converging spot P formed by one lens 124 corresponding to the target region B1(*n*) is included in the light intensity distribution data.

Subsequently, the control unit 13 specifies position coordinates of a converging spot P(n) by calculating a center of gravity of the converging spot P(n) included in the light intensity distribution data (step S24). When the center of gravity is calculated, the exclusion of a data value less than a predetermined threshold value, a noise reduction process, etc. may also be performed. Subsequently, an evaluation value of the converging spot P(n) is calculated (step S25). The evaluation value, for example, is a numeric value representing the reliability of the converging spot P(n) such as a light intensity or a spread condition (spot diameter) of the converging spot P(n). In subsequent steps, only information about converging spots P(n) having the evaluation value satisfying a predetermined condition is used in calculation.

Subsequently, the control unit 13 determines whether the variable n indicating the number of iterations reaches a maximum value Nmax (step S26). The maximum value Nmax, for example, is set as the number of regions 11*b* (=N) included in the modulation surface 11*a*. When the variable n does not reach the maximum value Nmax (step S26; No), steps S22 to S26 are iterated again after 1 is added to the variable n, that is, in another different region 11*b*. In addition, when the variable n reaches the maximum value Nmax (step S26; Yes), the following steps S28 and S29 are performed.

In step S28, a distance (an amount of positional displacement) between position coordinates of each converging spot P and a reference position is calculated for each converging spot P. Thereafter, in step S29, wavefront distortion (aberration) is calculated by applying the amount of positional displacement of each converging spot P calculated in step S28 to a wavefront equation (wavefront distortion calculating step).

Also, in the above-described wavefront measuring process, step S25 or both steps S24 and S25 may be performed after n reaches Nmax in step S26. Alternatively, step S28 may be performed between steps S25 and S26.

Description will now return to FIG. 10. Subsequently, the control unit 13 calculates a phase pattern (control pattern) for compensating for wavefront distortion to be displayed on the modulation surface 11*a* of the spatial light modulator 11 and updates a control signal S2 (step S13, displaying step). In step S13, for example, a phase pattern for correcting wavefront distortion (aberration) calculated in a previous wavefront measuring step S12 (for example, close to zero) is calculated. The control signal S2 according to the calculated phase pattern is output from the control unit 13 to the control circuit unit 17. The control circuit unit 17 supplies a control voltage V1 according to the control signal S2 to the spatial light modulator 11. Thereby, the phase pattern for correcting the wavefront distortion is displayed on the modulation surface 11*a*.

Figure 12:
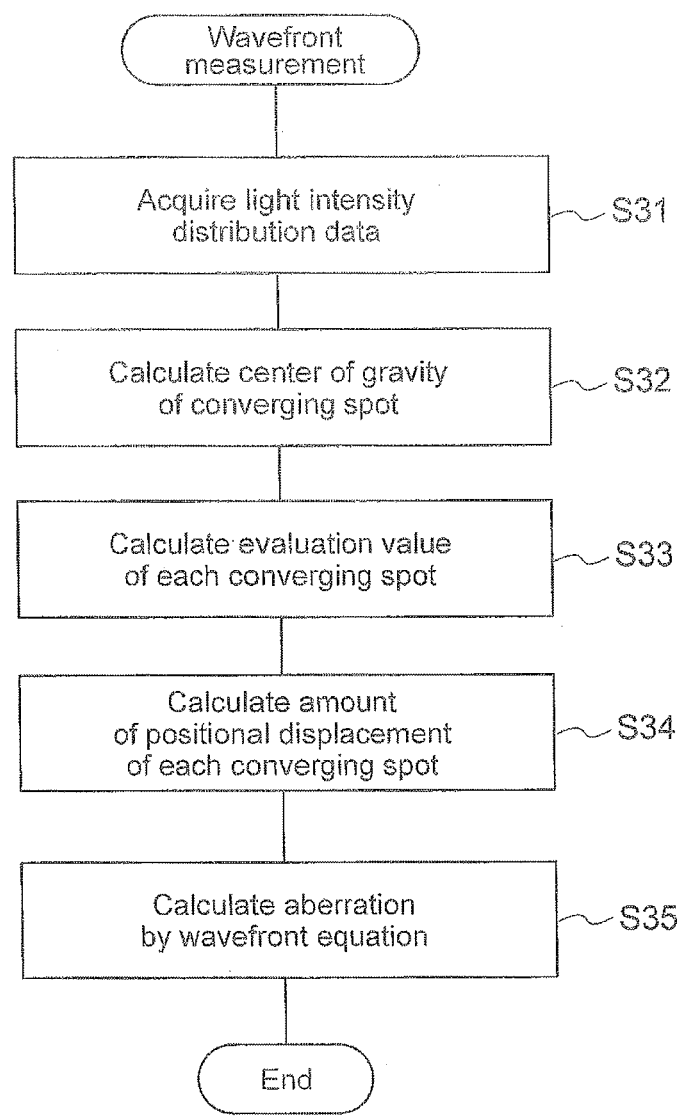
FIG. 12 is a flowchart illustrating an example of a normal wavefront measuring process to be executed in a control unit.

Subsequently, the control unit 13 performs wavefront measurement (aberration measurement) again (step S14). However, in this wavefront measuring step S14, wavefront measurement is performed using a normal wavefront measuring method different from the above-described wavefront measuring step S12. FIG. 12 is a flowchart illustrating an example of the normal wavefront measuring process to be executed in the control unit 13. As illustrated in FIG. 12, the control unit 13 first acquires light intensity distribution data created by the image sensor 122 of the wavefront sensor 12 (step S31). As illustrated in FIG. 9(*b*), this light intensity distribution data includes K converging spots P formed by the N lenses 124. Next, the control unit 13 specifies position coordinates of each of the K converging spots P by calculating a center of gravity of each of the K converging spots P included in the light intensity distribution data (step S32). As in the above-described step S24, when the center of gravity is calculated, the exclusion of a data value less than a predetermined threshold value, a noise reduction process, etc. may also be performed. Subsequently, evaluation values of the K converging spots P are calculated (step S33). Subsequently, a distance (an amount of positional displacement) between position coordinates of each converging spot P and a reference position is calculated for each converging spot P (step S34). Thereafter, wavefront distortion (aberration) is calculated by applying the amount of positional displacement of each converging spot P calculated in step S34 to a wavefront equation (step S35).

Description will now return to FIG. 10. The control unit 13 externally receives a command signal indicating whether to end the wavefront compensation operation (step S16). This command signal, for example, is input by a person who manipulates an apparatus including the adaptive optics system 10. When there is an end command (step S16; Yes), the process ends via an end processing step S17. In addition, when there is no end command (step S16; No), the above-described steps S14 to S16 are iterated. Also, in the end processing step S17, for example, release or the like of a memory region of the control unit 13 is performed.

Effects obtained by the adaptive optics system 10 of this embodiment, the correspondence relation specifying method therefor, the wavefront distortion compensation method, the program for the adaptive optics system, and the storage medium storing the program for the adaptive optics system described above will be described.

In this embodiment, in the light intensity distribution acquiring step S23, a light intensity distribution is acquired by the image sensor 122 of the wavefront sensor 12 in a state in which a phase pattern having linearity in at least one direction is displayed in a target region B1 of the spatial light modulator 11 and a spatial non-linear phase pattern is displayed in a plurality of regions (regions B2) surrounding the target region B1. In this light intensity distribution acquiring step S23, the converging spot P corresponding to the target region B1 is formed on the image sensor 122. Also, because light diverges according to the non-linear phase pattern displayed in the region B2, the converging spot P corresponding to the region B2 is not formed or its light intensity is weakened. Therefore, as illustrated in FIG. 9(a), there is no converging spot P around the converging spot P corresponding to the target region B1 or the clarity of the converging spot P is significantly degraded as compared with the converging spot P corresponding to the target region B1. Therefore, it is possible to easily specify the converging spot P corresponding to the target region B1.

As described above, according to the adaptive optics system 10 of this embodiment, the correspondence relation specifying method therefor, the wavefront distortion compensation method, the program for the adaptive optics system, and the storage medium storing the program for the adaptive optics system, it is possible to perform a wavefront compensation operation while accurately specifying a correspondence relation between the converging spot P of the wavefront sensor 12 and the region 11b on the modulation surface 11a of the spatial light modulator 11 to be controlled based on the aberration calculated from the position of the converging spot P. Accordingly, it is possible to precisely compensate for larger wavefront distortion. In addition, it is possible to suppress an increase of the number of components because it is unnecessary to add a new component such as an optical plate like that in the configuration disclosed in Patent Literature 1, and it is possible to maintain wavefront detection precision by suppressing an increase of loss of light to be measured.

Also, as in this embodiment, N light intensity distributions corresponding to N regions may be acquired by iterating the light intensity distribution acquiring step S23 N times while sequentially setting the N regions of the spatial light modulator 11 as the target region B1 one by one. Thereby, it is possible to precisely compensate for larger wavefront distortion in all regions 11b of the spatial light modulator 11.

Here, an example of a "spatially non-linear second phase pattern" displayed in the region B2 of the modulation surface 11a in step S22 is shown. FIGS. 13 to 16 are diagrams illustrating examples of such a phase pattern, wherein a magnitude of a phase is shown according to light and shade, a phase of a darkest part is 0 (rad), and a phase of a brightest part is $2\pi$ (rad).

Figure 13:
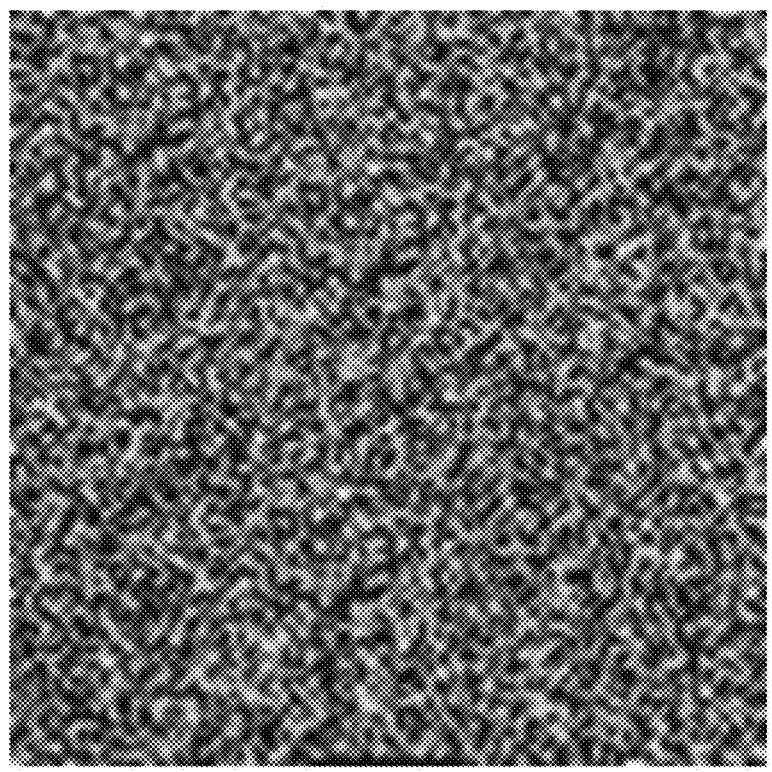
FIG. 13 is a diagram illustrating a random distribution in which a distribution of magnitudes of phases is irregular as an example of a spatially non-linear phase pattern.
Figure 14:
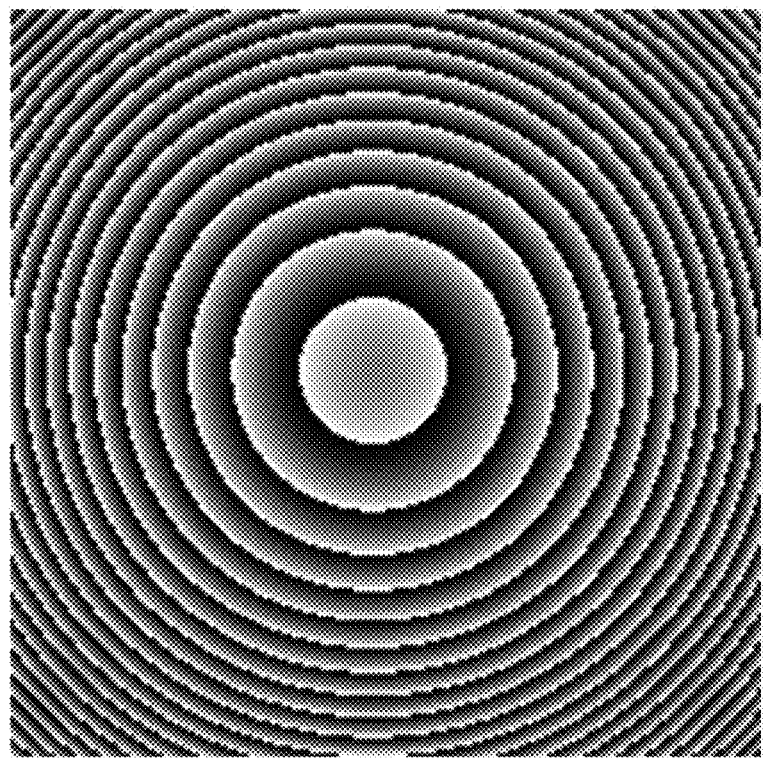
FIG. 14 is a diagram illustrating a defocus distribution which increases a diameter of a converging spot as an example of the spatially non-linear phase pattern.
Figure 15:
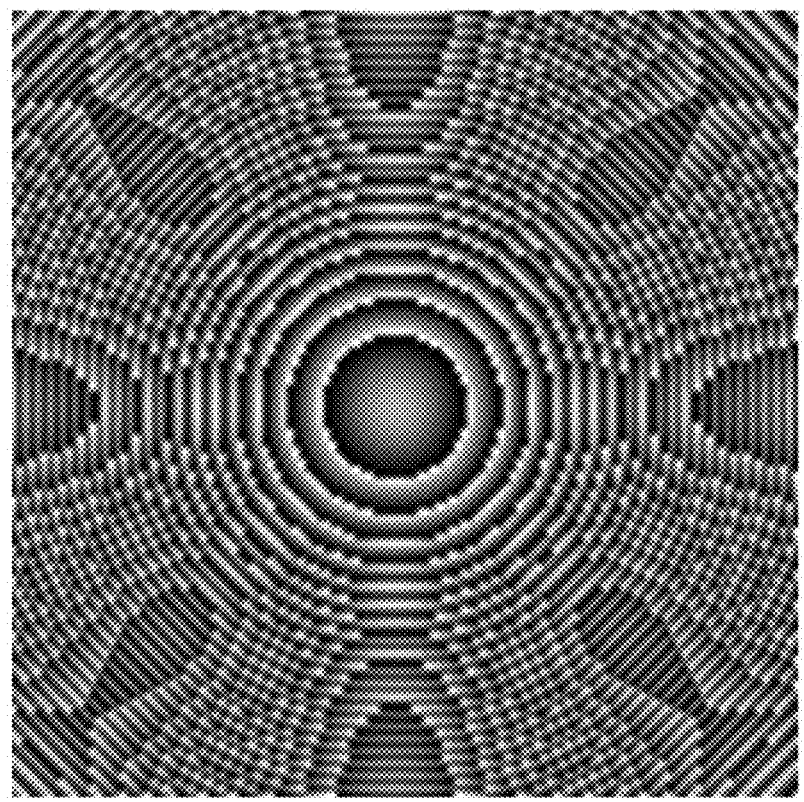
FIG. 15 is a diagram illustrating a distribution which causes a large spherical aberration in an optical image as an example of the spatially non-linear phase pattern.
Figure 16:
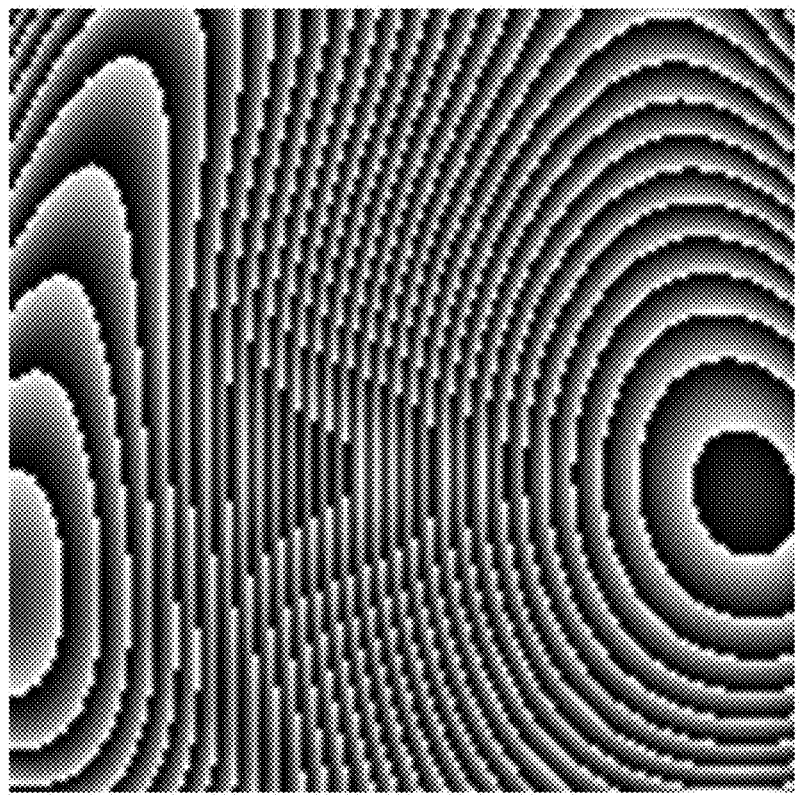
FIG. 16 is a diagram illustrating a distribution which causes a large high-order aberration in the optical image as an example of the spatially non-linear phase pattern.

FIG. 13 illustrates a random distribution in which a distribution of magnitudes of phases is irregular. When this phase pattern is displayed in the region B2, the optical image L1 of a relevant part diverges and a clear converging spot P is not formed or a maximum light intensity is reduced. FIG. 14 illustrates a defocus distribution which increases a diameter of a converging spot P. When such a phase pattern is displayed in the region B2, a clear converging spot P is not formed or the maximum light intensity is reduced because the optical image L1 of the relevant part is conversely widened without converging. Also, FIG. 15 illustrates a distribution which causes a large spherical aberration in the optical image L1. Instead of the phase pattern which causes the spherical aberration, a phase pattern which causes a large astigmatic aberration or coma aberration may be used. FIG. 16 illustrates a distribution in which an aberration including a higher-order aberration than a spherical aberration, an astigmatic aberration, or a coma aberration occurs in the optical image L1. Even when the phase pattern illustrated in FIG. 15 or 16 is displayed in the region B2, the clear converging spot P is not formed. The spatially non-linear phase pattern may include at least one of the above-described distributions, may include a composite pattern in which at least one of the above-described distributions and a linear phase pattern are superimposed, or may include a composite pattern in which at least one of the above-described distributions and a phase pattern for compensating for wavefront distortion for which wavefront measurement is performed are superimposed.

Also, an example of a "phase pattern having linearity in at least one direction" to be displayed in the target region B1 of the modulation surface 11a in step S22 is as follows. FIGS. 17 to 20 are diagrams illustrating examples of such a phase pattern and a magnitude of a phase is indicated according to light and shade as in FIGS. 13 to 16.

Figure 17:
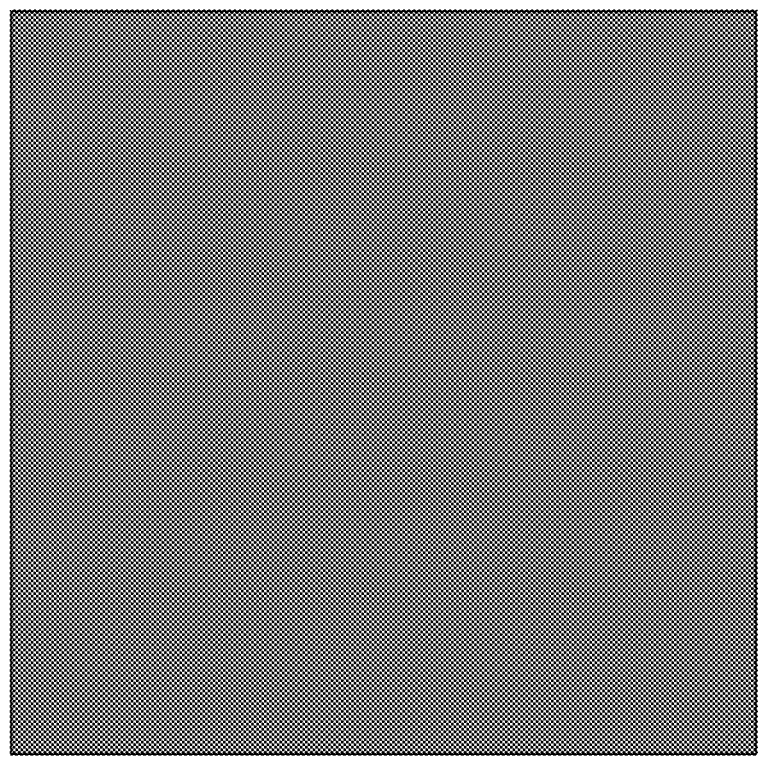
FIG. 17 is a diagram illustrating a phase distribution in which phase values are substantially uniform across the total modulation surface as an example of a phase pattern having linearity in at least one direction.
Figure 18:
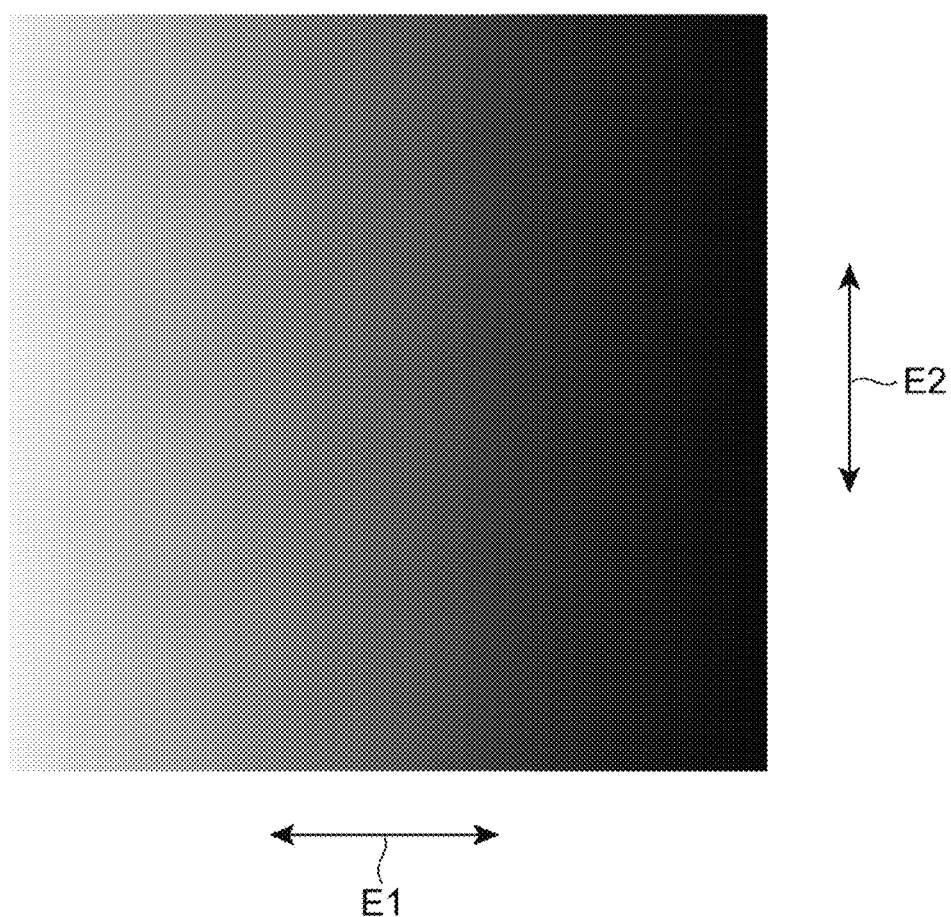
FIG. 18 is a diagram illustrating a phase distribution in which phase values are inclined in a first direction and phase values are substantially uniform in a second direction intersecting (for example, orthogonal to) the first direction as an example of a phase pattern having linearity in at least one direction.
Figure 19:
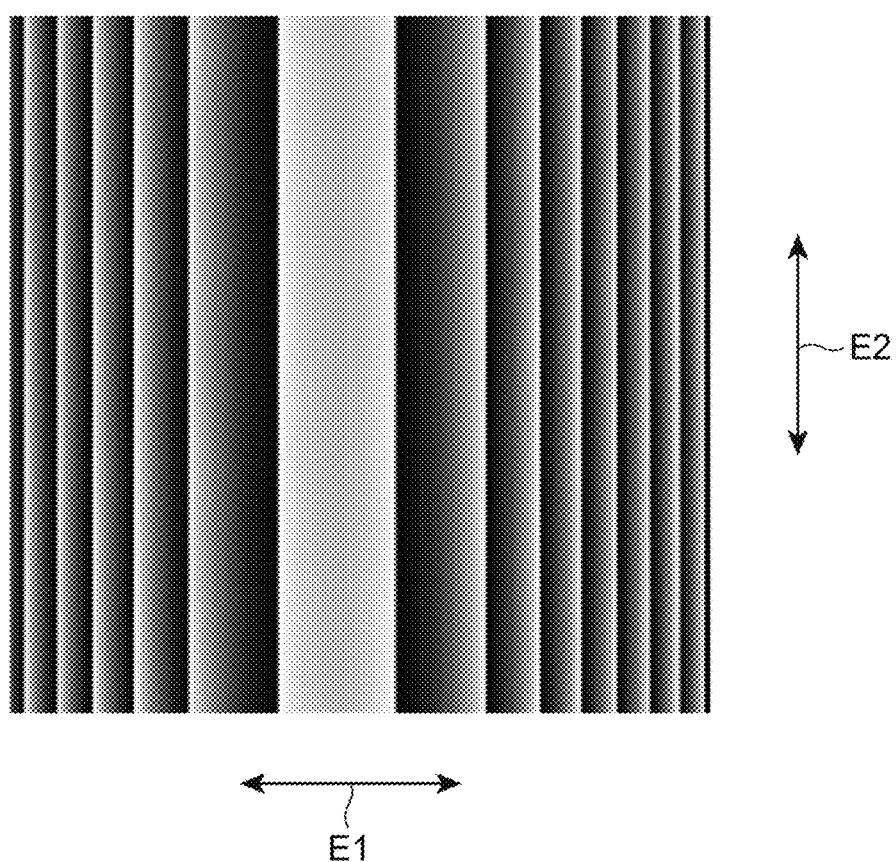
FIG. 19 is a diagram illustrating a phase distribution having a cylindrical lens effect in the first direction and in which phase values are substantially uniform in the second direction as an example of a phase pattern having linearity in at least one direction.
Figure 20:
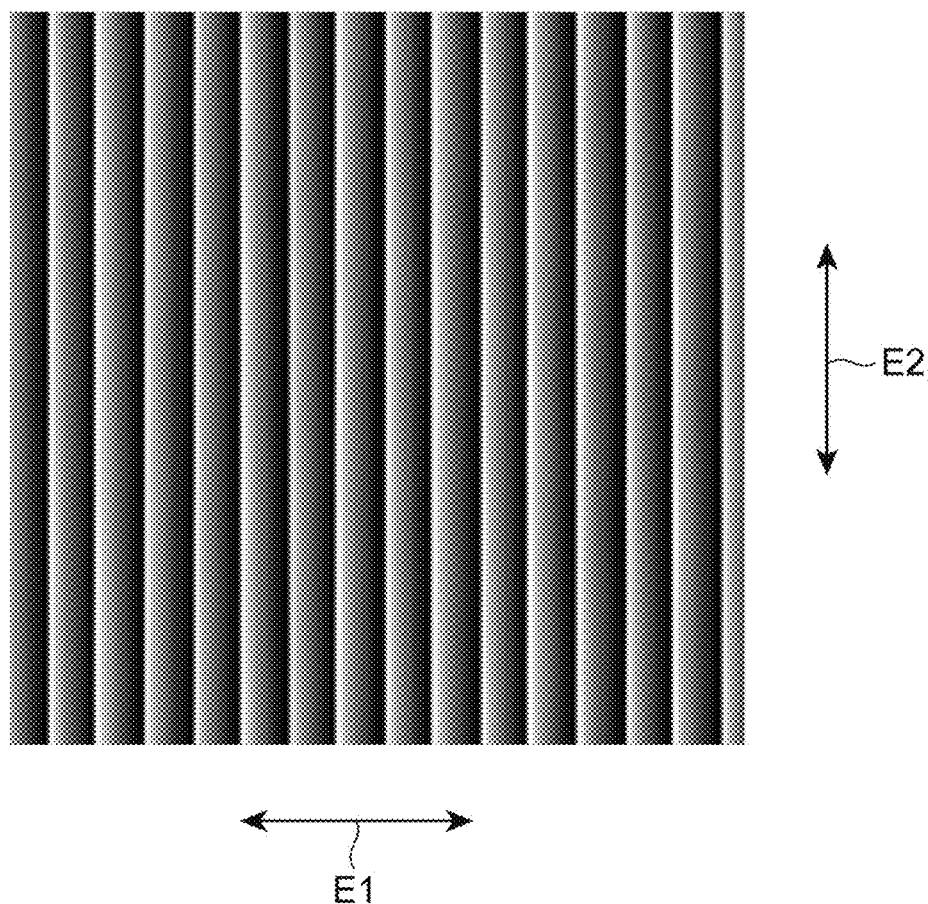
FIG. 20 is a diagram illustrating a phase distribution constituting a diffraction grating in the first direction and in which phase values are substantially uniform in the second direction as an example of a phase pattern having linearity in at least one direction.

FIG. 17 is a diagram illustrating a phase distribution in which phase values are substantially uniform across the total modulation surface 11a. Also, FIG. 18 is a diagram illustrating a phase distribution in which phase values are inclined in a first direction (an arrow E1 in the drawing) and phase values are substantially uniform in a second direction (an arrow E2 in the drawing) intersecting (for example, orthogonal to) the first direction. Because the wavefront of the optical image L1 of the relevant part is flat when the phase pattern as illustrated in FIG. 17 or 18 is displayed in the target region B1, the clear converging spot P is formed by the lens 124. Also, FIG. 19 is a diagram illustrating a phase distribution having a cylindrical lens effect in the first direction E1 and in which phase values are substantially uniform in the second direction E2. Also, FIG. 20 is a diagram illustrating a phase distribution constituting a diffraction grating in the first direction E1 and in which phase values are substantially uniform in the second direction E2. Because the light diverges in the first direction E1, but converges in the second direction E2 when the phase pattern illustrated in FIG. 19 or 20 is displayed in the target region B1, the shape of the relevant direction of the converging spot P is maintained. The phase pattern having the linearity in at least one direction can include at least one of the above-described distributions. Alternatively, the phase pattern may include a composite profile in which these distributions are superimposed on each other. FIG. 21 is a diagram illustrating an example of a composite pattern obtained through such superimposition. The phase pattern illustrated in FIG. 21(a) is illustrated in FIG. 19. The phase pattern illustrated in FIG. 21(b) is obtained by rotating the phase pattern illustrated in FIG. 18 90 degrees. The phase pattern illustrated in FIG. 21(c) is a composite profile in which the phase patterns are superimposed. Because light diverges in the first direction E1, but converges in the second direction E2 in the composite profile illustrated in FIG. 21(c), the shape of the relevant direction is maintained.

Figure 22:
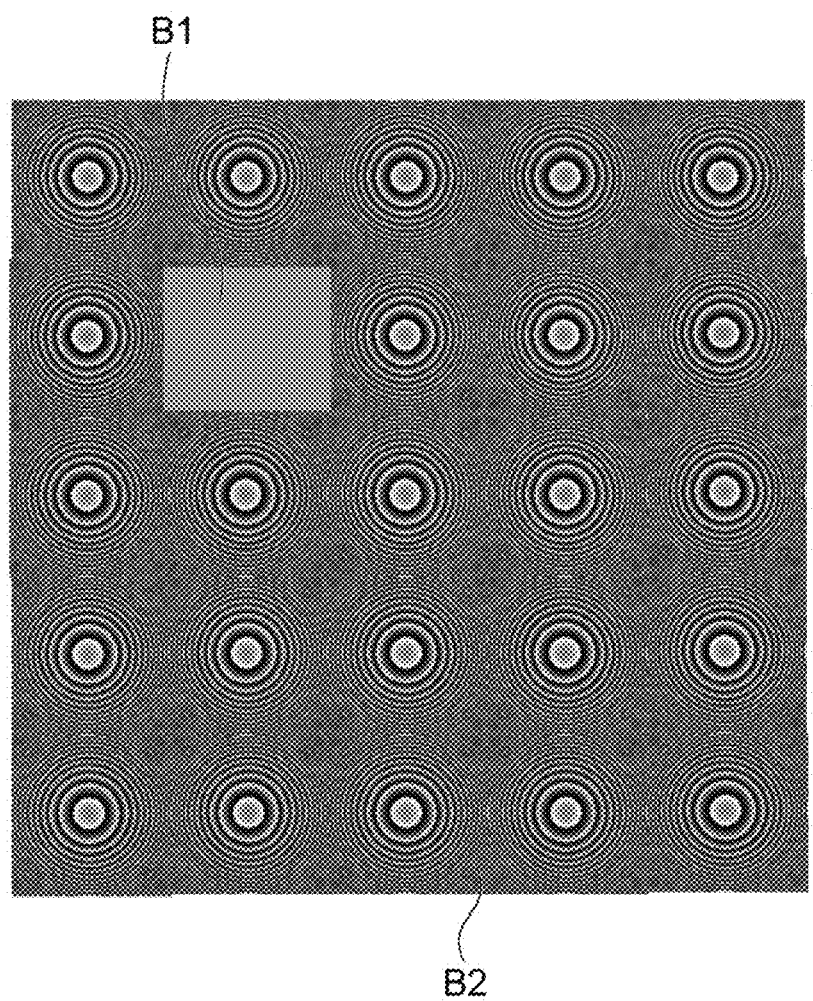
FIG. 22 is a diagram illustrating a phase pattern in which a mutually common phase distribution is arranged in regions of a modulation surface included in a region around the target region.
Figure 23:
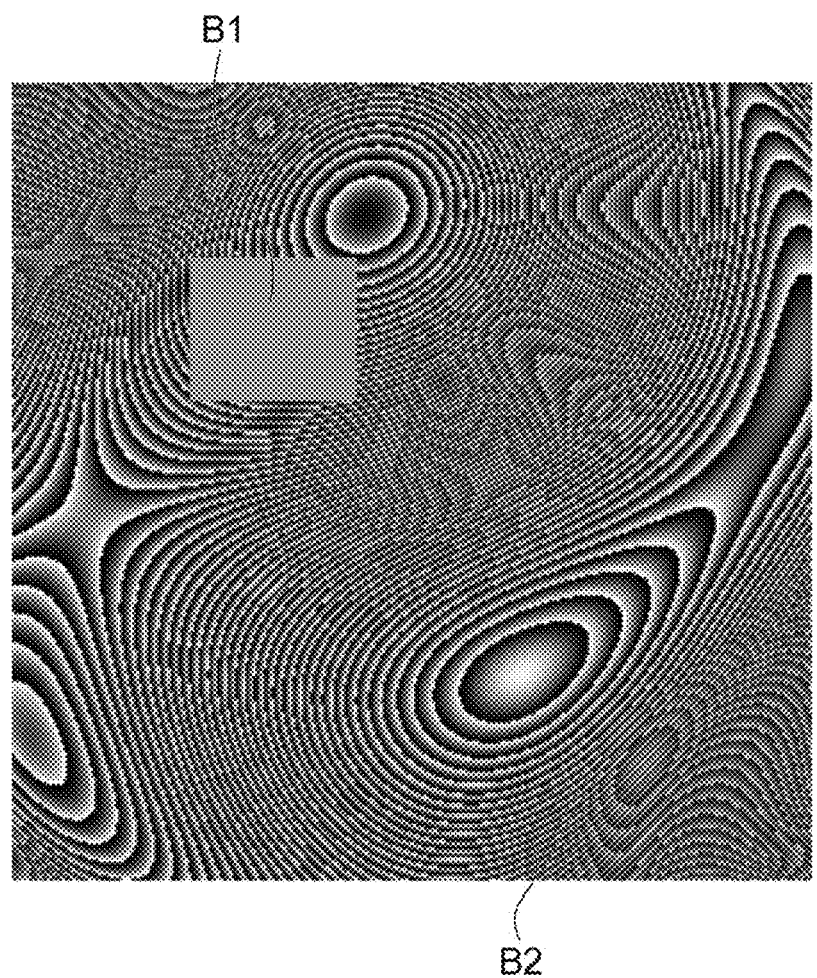
FIG. 23 is a diagram illustrating a phase pattern in which different phase distributions are arranged in regions of a modulation surface included in a region around the target region.

In addition, for the non-linear phase pattern displayed in the region B2 around the target region B1, a mutually common phase distribution may be displayed in regions 11b of the modulation surface 11a and different phase distributions may be displayed in the regions 11b. FIG. 22 is a diagram illustrating a phase pattern in which a mutually common phase distribution (for example, a defocus distribution) is arranged in regions 11b within the region B2. In addition, FIG. 23 illustrates a phase pattern in which different phase distributions (for example, random distributions) are arranged in the regions 11b of the region B2.

First Modified Example

Figure 24:
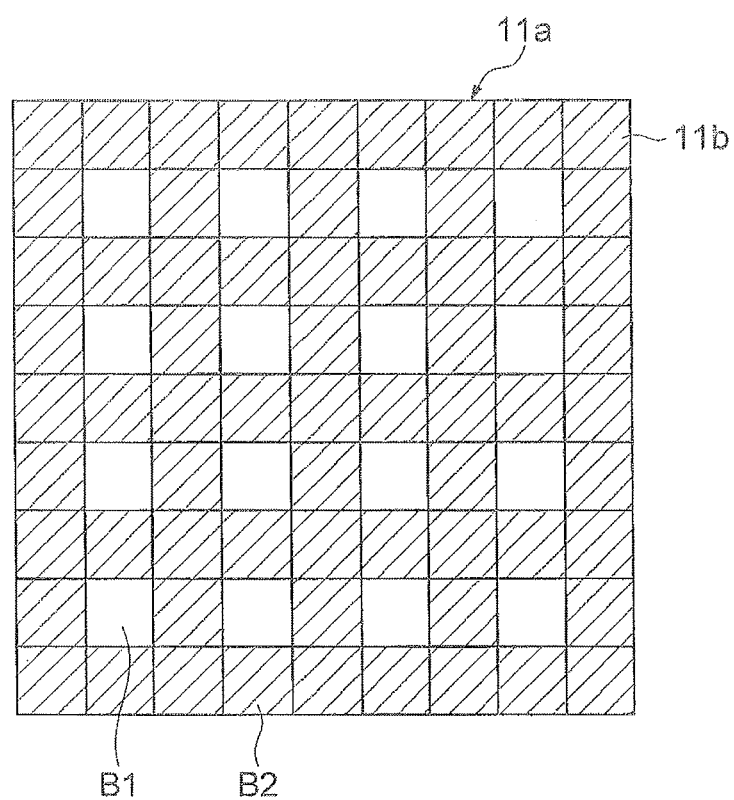
FIG. 24 is a diagram illustrating an example in which a plurality of target regions are set at one time.

In the above-described first embodiment, as illustrated in FIG. 8, only one target region B1 is set in the modulation surface 11a, but a plurality of target regions B1 may be set at one time. FIG. 24 is a diagram illustrating an example in which the plurality of target regions B1 are set at one time. Also, in FIG. 24, the target region B1 is indicated by a blank and parallel diagonal lines are attached to a region B2 around the target region B1 to distinguish from the target region B1. As illustrated in FIG. 24, in this modified example, a plurality of regions 11b which are not adjacent to each other is set as the target region B1 and a phase pattern having linearity in at least one direction is displayed. In addition, a spatially non-linear phase pattern is displayed in another region B2. Also, because a size of the region B2 between the target regions B1 adjacent to each other is for one region 11b in an example illustrated in FIG. 24, a range in which the detection of the converging spot P is possible is enlarged to be twice a diameter of the lens 124.

Figure 25:
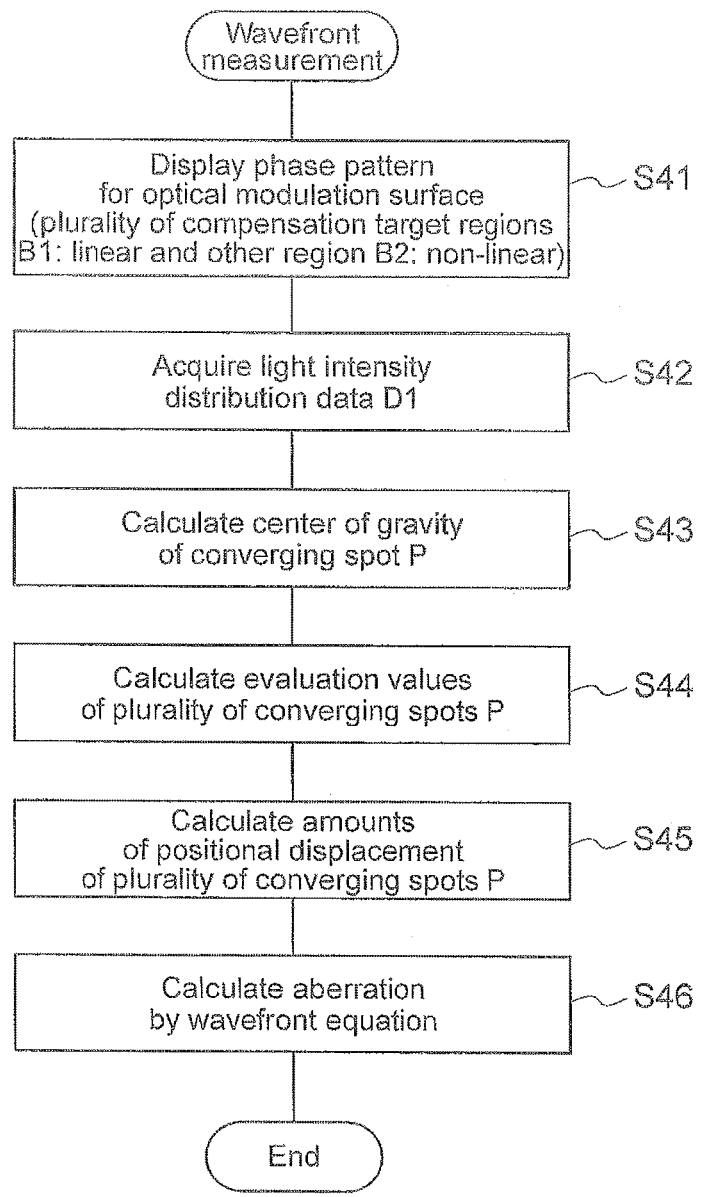
FIG. 25 is a flowchart illustrating a wavefront measuring process according to a first modified example.

FIG. 25 is a flowchart illustrating a wavefront measuring process (corresponding to step S12 illustrated in FIG. 10) according to this modified example. In this modified example, the control unit 13 first causes a phase pattern having linearity in at least one direction to be displayed in a plurality of target regions B1 (see FIG. 24) on the modulation surface 11a. Simultaneously, the control unit 13 causes the spatially non-linear phase pattern to be displayed in the other region B2 on the modulation surface 11a (step S41). In this state, the control unit 13 acquires light intensity distribution data created by the image sensor 122 of the wavefront sensor 12 (step S42, light intensity distribution acquiring step in this modified example). This light intensity distribution data includes a plurality of converging spots P formed by a plurality of lenses 124 corresponding to a plurality of target regions B1.

Subsequently, the control unit 13 specifies position coordinates of a plurality of converging spots P by calculating centers of gravity of the plurality of converging spots P included in the light intensity distribution data (step S43). As in the above-described first embodiment, when the center of gravity is calculated, the exclusion of a data value less than a predetermined threshold value, a noise reduction process, etc. may also be performed. Subsequently, evaluation values of the plurality of converging spots P are calculated (step S44). Thereafter, a distance (an amount of positional displacement) between the position coordinates of each converging spot P and the reference position is calculated for each converging spot P (step S45). The wavefront distortion (aberration) is calculated by applying the amount of positional displacement of each converging spot P calculated in step S45 to the wavefront equation (step S46).

Also, in this step S46, wavefront distortion is calculated based on position coordinates of only a plurality of converging spots P corresponding to a plurality of target regions B1 and a converging spot corresponding to the region B2 is not used. Accordingly, the precision at the time of calculating the wavefront distortion is low as compared with the above-described first embodiment, but the processing time is significantly further shortened than that of the above-described first embodiment if there is no practical problem. The cases in which there is no practical problem are (1) the case in which sufficient measurement precision is obtained in a subsequent wavefront measuring step S14 illustrated in FIG. 10, (2) the case in which a low-order aberration component of a wavefront which is a measurement target is large, and the like. For example, when the adaptive optics system is applied to an ocular fundus imaging apparatus in (2), an ocular aberration caused by a cornea, a lens, tears, or the like normally includes a low-order aberration such as a second- or third-order aberration. Therefore, it is possible to sufficiently precisely measure the aberration if the number of target regions B1, for example, is set to be larger than 10.

According to this modified example including the above configuration, it is possible to have similar effects to the above-described first embodiment. Further, in this modified example, it is possible to shorten the processing time by specifying the correspondence relation between a plurality of target regions B1 of the spatial light modulator 11 and a plurality of converging spots P at one time.

Second Modified Example

Although a plurality of target regions B1 are set at one time and wavefront compensation is performed based on one piece of obtained light intensity distribution data in the above-described first modified example, two or more pieces of light intensity distribution data may be acquired while a plurality of target regions B1 change and the wavefront compensation may be performed based on the two or more pieces of light intensity distribution data.

Figure 26:
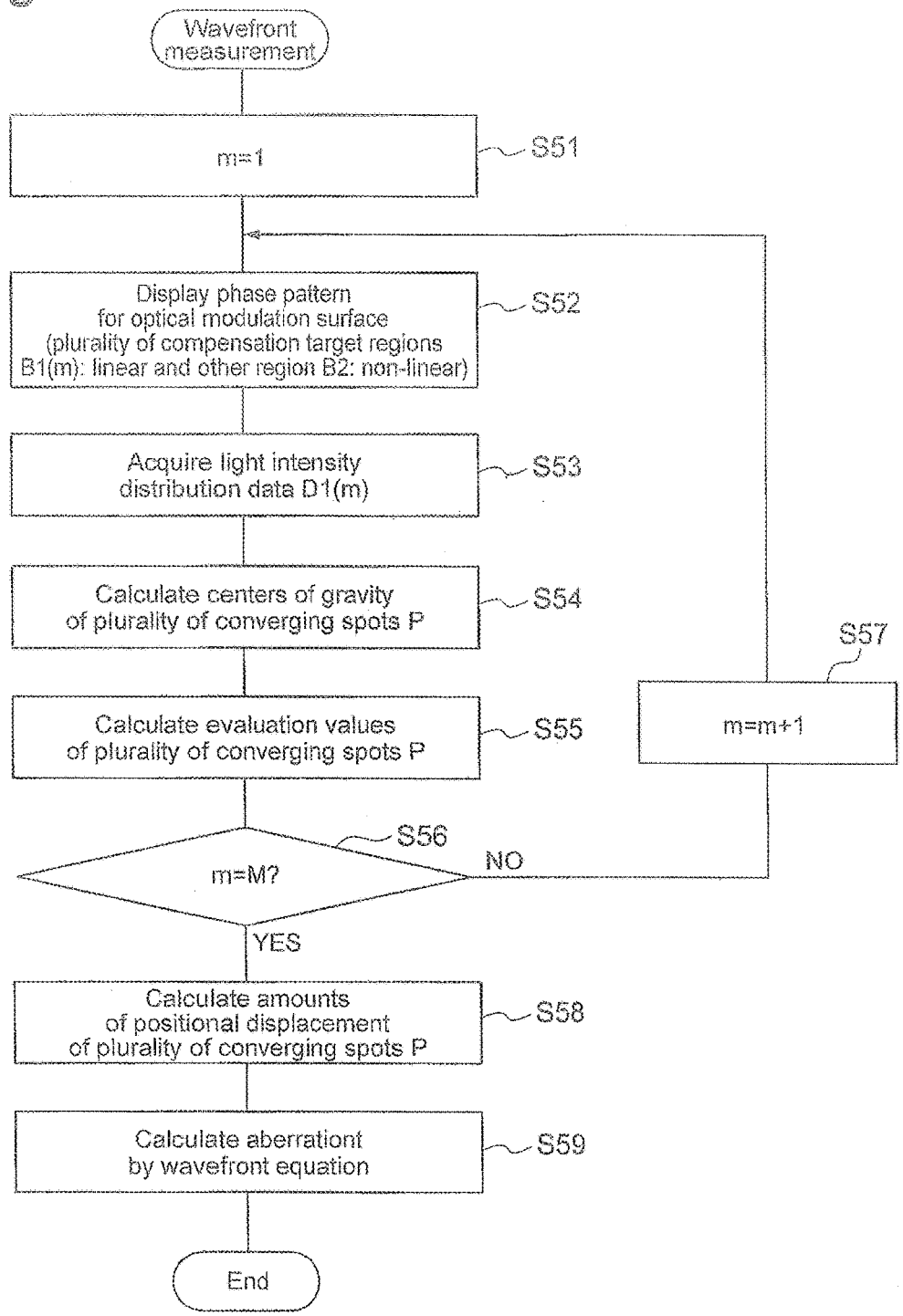
FIG. 26 is a flowchart illustrating a wavefront measuring process according to a second modified example.
Figure 27:
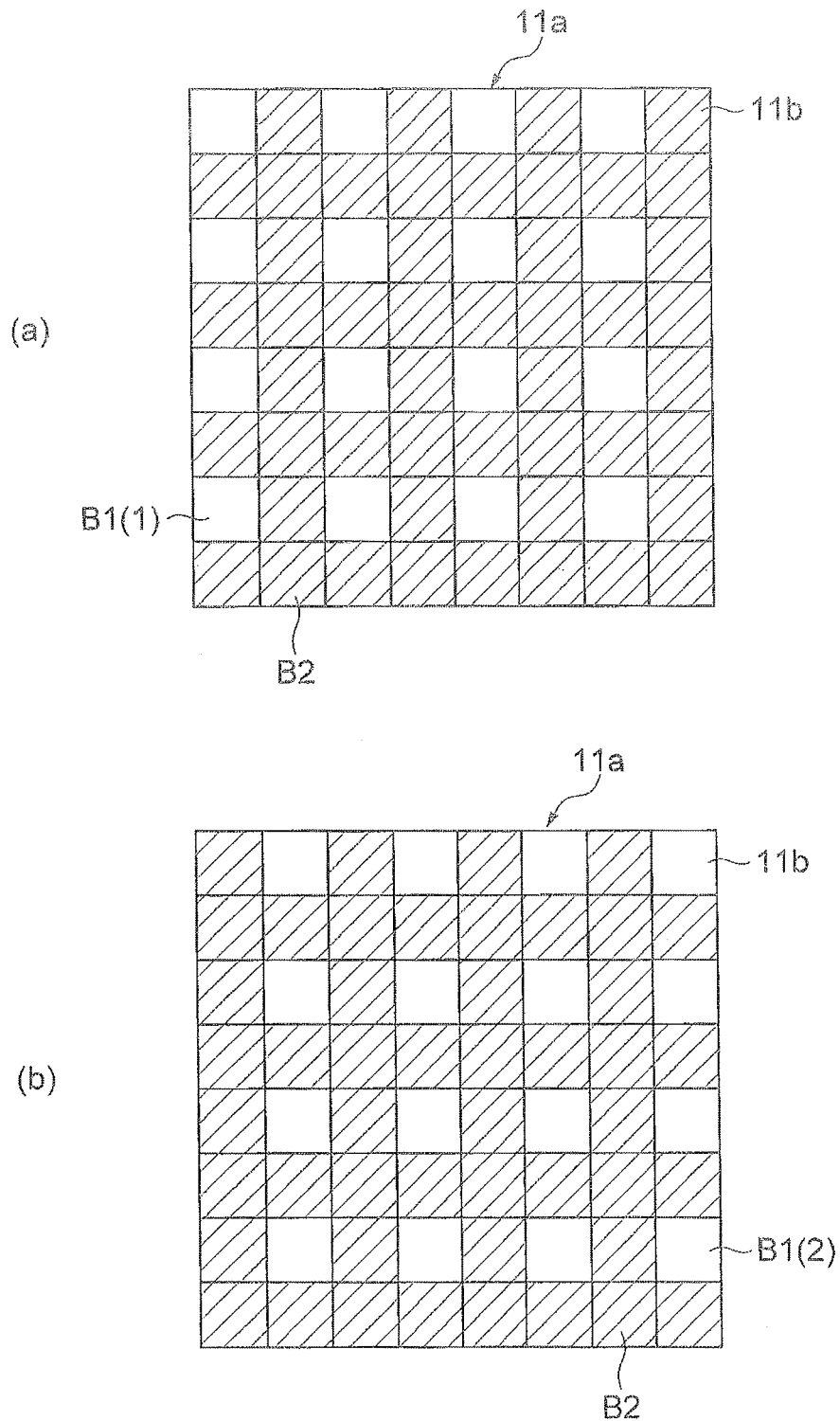
FIG. 27 is a diagram illustrating an example of an arrangement of a plurality of target regions according to the second modified example.

FIG. 26 is a flowchart illustrating a wavefront measuring process (corresponding to step S12 illustrated in FIG. 10) according to this modified example. In this modified example, the control unit 13 first sets a variable m indicating the number of iterations to 1 (step S51). Next, the control unit 13 causes a phase pattern having linearity in at least one direction to be displayed in a plurality of target regions B (m) on the modulation surface 11a. Simultaneously, the control unit 13 causes the spatially non-linear phase pattern to be displayed in another region B2 on the modulation surface 11a (step S52). Here, FIGS. 27 and 28 are diagrams illustrating examples of arrangements of the plurality of target regions B1(m) set in step S52. Also, FIGS. 27 and 28 illustrate arrangements for the variable m=1, 2, 3, and 4 when a maximum value M (M is an integer greater than or equal to 2) of the variable m is 4. In addition, the target region B1 is indicated by a blank and parallel diagonal lines are attached to a region B2 around the target region B1 to distinguish from the target region B1 in FIGS. 27 and 28 as well.

In the four forms illustrated in FIGS. 27(a) and 27(b) and FIGS. 28(a) and 28(b), a point at which the plurality of target regions B1 are set is common, but positions of regions 11b set as the target region B1 are different from each other. Specifically, assuming that a region formed of a region 11b of two rows and two columns is one unit region, a region 11b of a first row and a first column within the unit region is set as a target region B1(1) in FIG. 27(a), a region 11b of the first row and a second column is set as a target region B1(2) in FIG. 27(b), a region 11b of a second row and a first column within a unit region is set as a target region B1(3) in FIG. 28(*a*), and a region 11*b* of the second row and a second column is set as a target region B1(4) in FIG. 28(*b*). Also, in the examples illustrated in FIGS. 27 and 28, as in FIG. 24, a plurality of regions 11*b* which are not adjacent to each other are set as the target region B1. Also, because a size of the region B2 between target regions B1 adjacent to each other is for one region 11*b*, a range in which the detection of the converging spot P is possible is enlarged to be twice a diameter of the lens 124 on the image sensor 122 of the wavefront sensor 12.

Description will now return to FIG. 26. In a state in which the above-described phase pattern is displayed, the control unit 13 acquires light intensity distribution data created by the image sensor 122 of the wavefront sensor 12 (step S53, light intensity distribution acquiring step in this modified example). This light intensity distribution data includes a plurality of converging spots P(m) formed by a plurality of lenses 124 corresponding to the target region B1(*m*).

Subsequently, the control unit 13 specifies position coordinates of the plurality of converging spots P(m) by calculating centers of gravity of the plurality of converging spots P(m) included in the light intensity distribution data (step S54). When the center of gravity is calculated, the exclusion of a data value less than a predetermined threshold value, a noise reduction process, etc. may also be performed as in the above-described embodiment. Subsequently, an evaluation value of the converging spot P(m) is calculated (step S55).

Subsequently, the control unit 13 determines whether the variable m indicating the number of iterations reaches a maximum value M (step S56). The maximum value M, for example, is set as a value obtained by dividing the number of regions 11*b* (=N) included in the modulation surface 11*a* by the number of target regions B1. When the variable m does not reach the maximum value M (step S56; No), steps S52 to S56 are iterated again after 1 is added to the variable m. In addition, when the variable m reaches the maximum value M (step S56; Yes), the following steps S58 and S59 are performed.

In step S58, a distance (an amount of positional displacement) between position coordinates of each converging spot P and a reference position is calculated for each converging spot P. Thereafter, in step S59, wavefront distortion (aberration) is calculated by applying the amount of positional displacement of each converging spot P calculated. In step S58 to a wavefront equation.

Also, in the above-described wavefront measuring process, step S55 or both steps S54 and S55 may be performed after m reaches M in step S56. Alternatively, step S58 may be performed between steps S55 and S56.

According to this modified example, it is possible to have similar effects to the above-described embodiments. In addition, this modified example is different from the first modified example in that M pieces of light intensity distribution data are acquired by iterating the light intensity distribution acquiring step S53 M times while N regions 11*b* of the spatial light modulator 11 are set as the target region B1 for every two or more regions. Accordingly, it is possible to improve precision when wavefront distortion is calculated as compared with the first modified example. In addition, because the number of iterations of the light intensity distribution acquiring step is smaller than that of the above-described first embodiment, it is possible to shorten the processing time as compared with the first embodiment.

Third Modified Example

Figure 29:
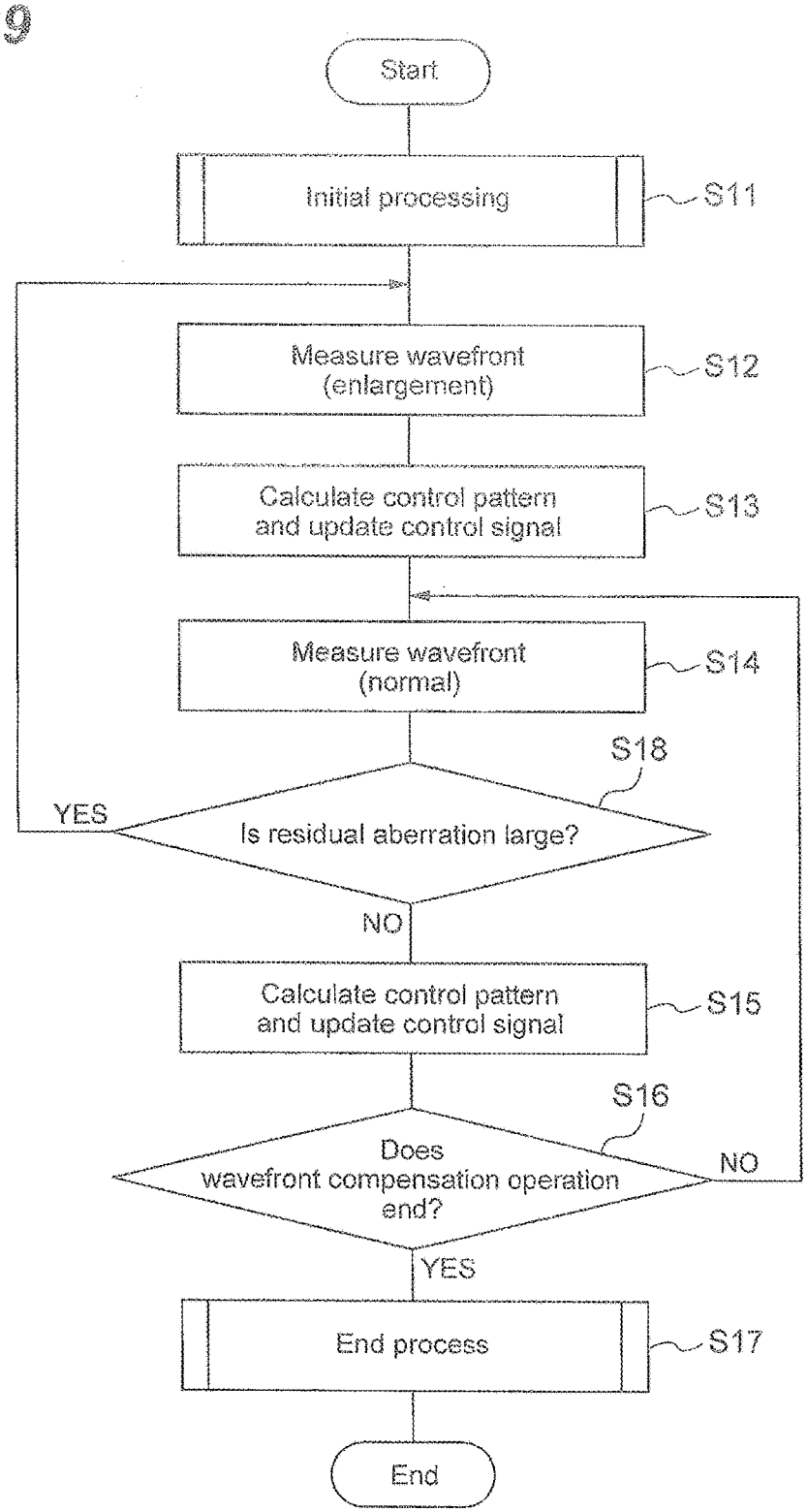
FIG. 29 is a flowchart illustrating an operation of an adaptive optics system and a wavefront distortion compensation method according to a third modified example.

FIG. 29 is a flowchart illustrating an operation of an adaptive optics system 10 and a wavefront distortion compensation method according to this modified example. In the above-described first embodiment, as illustrated in FIG. 10, a wavefront measuring step S12 in which a dynamic range is enlarged is initially performed once. On the other hand, in this modified example, the wavefront measuring step S12 is performed according to necessity.

In this modified example, as illustrated in FIG. 29, an initial processing step S11 of the control unit 13, a wavefront measuring step S12, and the calculation of a phase pattern for compensating for the wavefront distortion to be displayed on the modulation surface 11*a* and the update of the control signal (step S13) are sequentially performed. Also, content of these steps is similar to that of the first embodiment.

Subsequently, the control unit 13 performs normal wavefront measurement (step S14). Thereafter, the control unit 13 determines whether a residual aberration measured in the wavefront measuring step S14 is larger than a predetermined value (step S18). When the residual aberration is large (step S18; Yes), the control unit 13 performs the wavefront measuring step S12 in which the dynamic range is enlarged and step S13 again. In addition, when the residual aberration is small (step S18; No), the control unit 13 calculates a phase pattern for compensating for the wavefront distortion to be displayed on the modulation surface 11*a* based on a wavefront shape measured in a normal wavefront measuring step S14 and updates the control signal (step S15). Also, content of steps S14 and S15 is similar to that of the first embodiment.

Thereafter, the control unit 13 externally receives a command signal indicating whether to end the wavefront compensation operation (step S16). When there is an end command (step S16; Yes), the process ends via an end processing step S17. In addition, when there is no end command (step S16; No), the above-described step S14 and the subsequent steps (including the case of the return from step S18 to step S12) are iterated.

According to this modified example, it is possible to have similar effects to the above-described embodiments. Further, because the wavefront measuring step S12 is performed when the residual aberration is large in this modified example, it is possible to automatically enlarge a dynamic range and further simplify the operation of the adaptive optics system 10.

Figure 30:
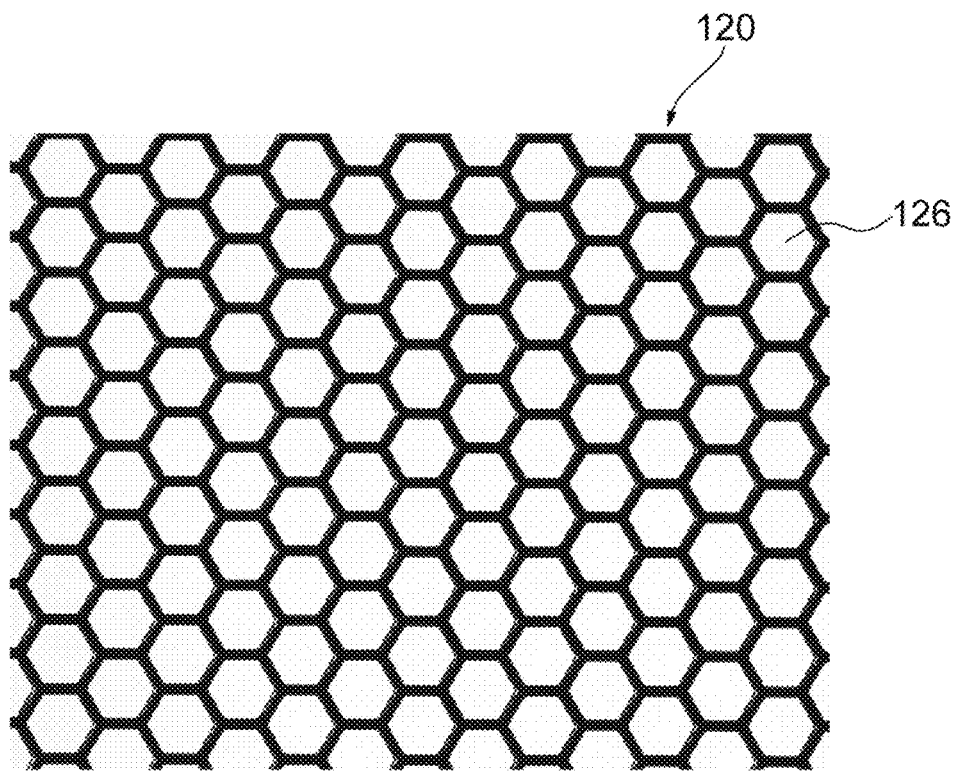
FIG. 30 is a diagram illustrating a modified example of a lens array.
Figure 31:
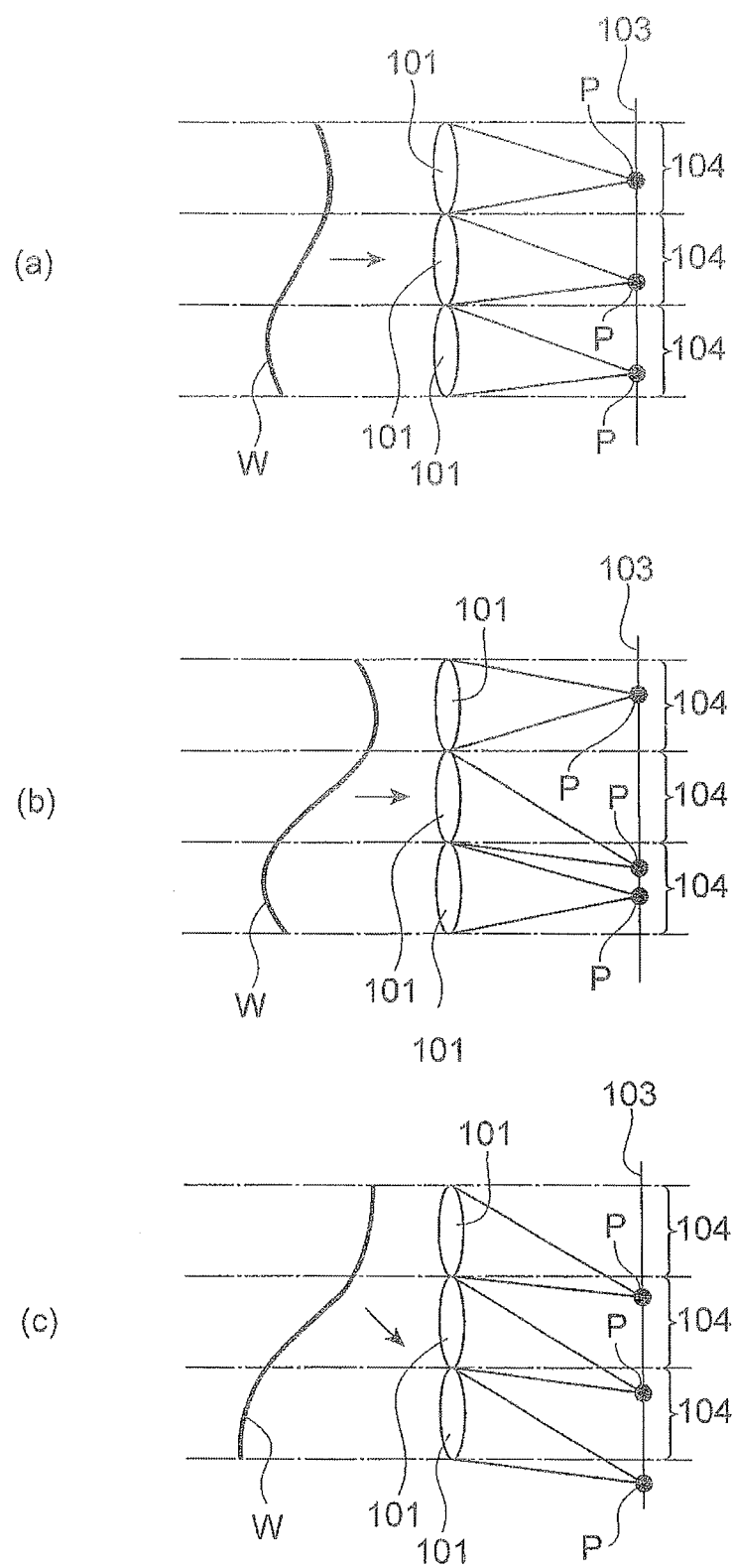
FIG. 31 is a diagram illustrating a correspondence relation between a plurality of lens and a plurality of converging spots when an optical image having a certain wavefront is incident on a wavefront sensor.

A correspondence relation specifying method for an adaptive optics system, an adaptive optics system, a wavefront distortion compensation method, a program for an adaptive optics system, and a storage medium storing a program for an adaptive optics system according to an aspect of the present invention are not limited to the above-described embodiments and various other modifications are possible. For example, in the above-described embodiments and modified examples, an example of a form in which the plurality of lenses 124 are arranged as the lens array 120 of the wavefront sensor 12 in the two-dimensional lattice shape as illustrated in FIG. 3 is shown. However, the lens array of the wavefront sensor 12 is not limited to such a form. For example, as illustrated in FIG. 30, the lens array 120 may have a honeycomb structure in which a plurality of regular hexagonal lenses 128 are arranged without gaps. In addition, a form in which a plurality of regular hexagonal pixels are arranged without gaps may be used as the spatial light modulator. In addition, the spatial light modulator using liquid crystal is described as an example in the above-described embodiments, but a spatial light modulator using a material having an electro-optic effect other than the liquid crystal, a spatial light modulator in which a pixel is formed of a micro-mirror, a variable mirror for deforming a film mirror using an actuator, or the like may be used.

INDUSTRIAL APPLICABILITY

According to a correspondence relation specifying method for an adaptive optics system, a wavefront distortion compensation method, an adaptive optics system, a program for an adaptive optics system, and a storage medium storing a program for an adaptive optics system according to an aspect of the present invention, it is possible to precisely compensate for larger wavefront distortion by accurately specifying a correspondence relation between a converging spot of a wavefront sensor and a region on a modulation surface of a spatial light modulator to be controlled based on a position of the converging spot while an increase of the number of components and an increase of loss of light to be measured are suppressed.

REFERENCE SIGNS LIST

10 Adaptive optics system
11 Spatial light modulator
11a Modulation surface
11b Region
12 Wavefront sensor
13 Control unit
13a Storage region
14 Beam splitter
15, 16 Relay lens
17 Control circuit unit
18 Optical detection element
120 Lens array
122 Image sensor
124 Lens
B1 Target region
L1 Optical image
P Converging spot

The invention claimed is:

1. A correspondence relation specifying method for an adaptive optics system, which includes a spatial light modulator configured to spatially modulate a phase of an optical image incident on a modulation surface including N (N is a natural number) two-dimensionally arranged regions and a wavefront sensor including a lens array having N two-dimensionally arranged lenses corresponding to the N regions and an optical detection element for detecting a light intensity distribution including K (K is a natural number and K≤N) converging spots formed by the lens array and configured to receive the optical image after the modulation from the spatial light modulator, wherein a correspondence relation between the region of the spatial light modulator and the converging spot formed in the wavefront sensor is specified, the correspondence relation specifying method comprising:
acquiring the light intensity distribution through the optical detection element in a state in which at least one region of the N regions of the spatial light modulator is set as a target region, a phase pattern having linearity in at least one direction is displayed in the target region, and a spatially non-linear phase pattern is displayed in a plurality of regions surrounding the target region.

2. The correspondence relation specifying method for the adaptive optics system according to claim 1, wherein the light intensity distribution is acquired while the N regions of the spatial light modulator are set as the target region one by one.

3. The correspondence relation specifying method for the adaptive optics system according to claim 1, wherein a plurality of regions which are not adjacent to each other among the N regions of the spatial light modulator are set as the target region and the light intensity distribution is acquired.

4. The correspondence relation specifying method for the adaptive optics system according to claim 3, wherein the light intensity distribution is acquired while the plurality of regions to be set as the target region change.

5. The correspondence relation specifying method for the adaptive optics system according to claim 1, wherein the spatially non-linear phase pattern includes a random distribution in which a distribution of magnitudes of phases is irregular.

6. The correspondence relation specifying method for the adaptive optics system according to claim 1, wherein the spatially non-linear phase pattern includes a defocus distribution which increases a diameter of the converging spot.

7. The correspondence relation specifying method for the adaptive optics system according to claim 1, wherein the phase pattern having the linearity in the at least one direction includes a substantially uniform phase pattern.

8. The correspondence relation specifying method for the adaptive optics system according to claim 1, wherein the phase pattern having the linearity in the at least one direction includes a phase distribution inclined in at least one direction.

9. The correspondence relation specifying method for the adaptive optics system according to claim 1, wherein the phase pattern having the linearity in the at least one direction includes a phase distribution having a cylindrical lens effect in a first direction and substantially uniform in a second direction intersecting the first direction.

10. The correspondence relation specifying method for the adaptive optics system according to claim 1, wherein the phase pattern having the linearity in the at least one direction includes a phase distribution constituting a diffraction grating in a first direction and substantially uniform in a second direction intersecting the first direction.

11. A wavefront distortion compensation method for an adaptive optics system, which includes a spatial light modulator configured to spatially modulate a phase of an optical image incident on a modulation surface including N (N is a natural number) two-dimensionally arranged regions and a wavefront sensor including a lens array having N two-dimensionally arranged lenses corresponding to the N regions and an optical detection element for detecting a light intensity distribution including K (K is a natural number and K≤N) converging spots formed by the lens array and configured to receive the optical image after the modulation from the spatial light modulator, wherein wavefront distortion is compensated for by controlling a phase pattern displayed in the spatial light modulator based on a wavefront shape of the optical image obtained from the light intensity distribution, the wavefront distortion compensation method comprising:
acquiring the light intensity distribution through the optical detection element in a state in which at least one region of the N regions of the spatial light modulator is set as a target region, a phase pattern having linearity in at least one direction is displayed in the target region, and a spatially non-linear phase pattern is displayed in a plurality of regions surrounding the target region;
calculating the wavefront distortion based on the light intensity distribution; and causing a phase pattern for correcting the wavefront distortion to be displayed on the modulation surface.

12. An adaptive optics system comprising:
a spatial light modulator configured to spatially modulate a phase of an optical image incident on a modulation surface including N (N is a natural number) two-dimensionally arranged regions;
a wavefront sensor including a lens array having N two-dimensionally arranged lenses corresponding to the N regions and an optical detection element for detecting a light intensity distribution including K (K is a natural number and K≤N) converging spots formed by the lens array and configured to receive the optical image after the modulation from the spatial light modulator; and
a control unit configured to compensate for wavefront distortion by controlling a phase pattern displayed in the spatial light modulator based on a wavefront shape of the optical image obtained from the light intensity distribution,
wherein the control unit acquires the light intensity distribution in a state in which at least one region of the N regions of the spatial light modulator is set as a target region, a phase pattern having linearity in at least one direction is displayed in the target region, and a spatially non-linear phase pattern is displayed in a plurality of regions surrounding the target region, calculates the wavefront distortion based on the light intensity distribution, and causes a phase pattern for correcting the wavefront distortion to be displayed on the modulation surface.

13. A storage medium storing a program for an adaptive optics system, which includes a spatial light modulator configured to spatially modulate a phase of an optical image incident on a modulation surface including N (N is a natural number) two-dimensionally arranged regions and a wavefront sensor including a lens array having N two-dimensionally arranged lenses corresponding to the N regions and an optical detection element for detecting a light intensity distribution including K (K is a natural number and K≤N) converging spots formed by the lens array and configured to receive the optical image after the modulation from the spatial light modulator, and a control unit configured to compensate for wavefront distortion by controlling a phase pattern displayed in the spatial light modulator based on a wavefront shape of the optical image obtained from the light intensity distribution, wherein the program for the adaptive optics system controls an operation of the control unit, the program for the adaptive optics system causing the control unit to execute:
a light intensity distribution acquiring step of acquiring the light intensity distribution in a state in which at least one region of the N regions of the spatial light modulator is set as a target region, a phase pattern having linearity in at least one direction is displayed in the target region, and a spatially non-linear phase pattern is displayed in a plurality of regions surrounding the target region;
a wavefront distortion calculating step of calculating the wavefront distortion based on the light intensity distribution; and
a displaying step of causing a phase pattern for correcting the wavefront distortion to be displayed on the modulation surface.

* * * * *